(12) United States Patent
Mohri et al.

(10) Patent No.: US 8,350,965 B2
(45) Date of Patent: Jan. 8, 2013

(54) PORTABLE TERMINAL DEVICE

(75) Inventors: Takayuki Mohri, Osaka (JP); Kei Okuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 343 days.

(21) Appl. No.: 12/755,850

(22) Filed: Apr. 7, 2010

(65) Prior Publication Data

US 2010/0208138 A1  Aug. 19, 2010

Related U.S. Application Data

(63) Continuation of application No. PCT/JP2008/065281, filed on Aug. 27, 2008.

(30) Foreign Application Priority Data

Oct. 12, 2007  (JP) ................................. 2007-266153

(51) Int. Cl.
*H04N 5/445* (2011.01)
*H04N 5/45* (2011.01)

(52) U.S. Cl. ......... 348/565; 348/561; 348/564; 348/734

(58) Field of Classification Search .................. 348/581, 348/731, 553–555, 556, 441, 445, 734, 558, 348/561–569; 345/130, 127, 115; *H04N 5/445, H04N 5/45*
See application file for complete search history.

(56) References Cited

U.S. PATENT DOCUMENTS

| | | | |
|---|---|---|---|
| 5,856,821 A * | 1/1999 | Funahashi | 345/667 |
| 6,678,009 B2 * | 1/2004 | Kahn | 348/569 |
| 7,148,909 B2 * | 12/2006 | Yui et al. | 345/660 |
| 7,876,382 B2 * | 1/2011 | Imaizumi | 348/565 |
| 2005/0197763 A1 | 9/2005 | Robbins et al. | |
| 2005/0225685 A1 | 10/2005 | Kim | |

FOREIGN PATENT DOCUMENTS

| | | |
|---|---|---|
| EP | 1 571 536 A2 | 9/2005 |
| JP | 4-199371 A | 7/1992 |
| JP | 5-127853 A | 5/1993 |
| JP | 9-050509 A | 2/1997 |
| JP | 2002-182638 A | 6/2002 |
| JP | 2004-110719 A | 4/2004 |
| JP | 2005-156627 A | 6/2005 |

* cited by examiner

*Primary Examiner* — Trang U Tran

(74) *Attorney, Agent, or Firm* — Birch, Stewart, Kolasch & Birch, LLP

(57) ABSTRACT

A portable terminal device includes: an operation part 7 including operation keys 71 that are two-dimensionally arranged in a matrix form; an image enlarging part 91 that, in a state where a plurality of enlargement target areas 93 are preliminarily set as partial areas of an image, generates an enlarged image by, on the basis of an operation of any of the operation keys 71, enlarging an image within an enlargement target area 93 preliminarily related to the operation key 71; a display image generating part 92 that generates a display image including the image in a normal or an enlargement browsing mode generates a display image including the enlarged image; and a display part 5 that displays the display image. The respective enlargement target areas 93 respectively correspond in an arrangement order to the operation keys 71, and form overlap areas with their adjacent enlargement target areas.

4 Claims, 18 Drawing Sheets

(a)

(b)

(c)

(a)

(b)

(c)

(a)

(b)

(c)

(a)

(b)

(c)

(a)

(b)

(c)

PORTABLE TERMINAL DEVICE

This application is a Continuation of copending PCT International Application No. PCT/JP2008/065281 filed on Aug. 27, 2008, which designated the United States, and on which priority is claimed under 35 U.S.C. §120. This application also claims priority under 35 U.S.C. §119(a) on Patent Application No. 2007-266153 filed in Japan on Oct. 12, 2007. The entire contents of each of the above documents is hereby incorporated by reference.

BACKGROUND OF THE INVENTION

1. Field of the Invention

The present invention relates to a portable terminal device, and more particularly, to an invention preferable for a portable terminal device enabling a TV broadcast to be watched.

2. Description of the Related Art

Cellular phones include one that has an antenna for receiving a TV broadcast wave transmitted from a broadcast base station; display a TV image on a display screen on the basis of the TV broadcast wave; and output TV voice corresponding to the TV image to thereby enable a TV broadcast to be watched.

As an example of this sort of cellular phone, there is one adapted such that a display screen is formed in a rectangular shape, and the display screen can be switched between a vertically long display state and a horizontally long display state. The cellular phone of which the display screen is formed in a rectangular shape as described is adapted such that, for example, in the above-described vertically long display state, a TV image is displayed with a longer direction of the display screen being vertical, whereas in the above-described horizontally long display state, the TV image is displayed with a shorter direction of the display screen being vertical.

Meanwhile, a TV image based on a TV broadcast wave transmitted from a broadcast base station may include characters and the like. For example, in a relay broadcast of a sport such as baseball, football, or volleyball, scores are typically displayed at the end of a display screen. However, a display screen of a cellular phone is very small as compared with that of a typical home-use TV set, and therefore the score display may be difficult to recognize.

For this reason, there is proposed a technique in which if characters and the like displayed on a display screen of a cellular phone are difficult to visually recognize, a corresponding part is enlarged and displayed (see, for example, Patent document 1 or 2).

In the cellular phone disclosed in Patent document 1 or 2, an entire area of the display screen is equally sectioned corresponding to an arrangement of respective keys in a ten-key pad to form enlargement target areas. Also, the cellular phone is adapted such that if a key operation is performed with a predetermined key, an image within an enlargement target area corresponding to the key is enlarged and displayed.

In addition, the cellular phone having the enlargement display function in Patent document is adapted to, by performing a long pressing operation of the predetermined key for a predetermined time period, enlarge and display the image within the enlargement target area corresponding to the key. Also, the cellular phone is adapted such that when the enlarged image display state is restored to an original image state, the same key is again operated.

Also, in Patent document 2, a system is adapted such that operations of dividing an image into a plurality of pieces to form divided images, and enlarging the divided images at a predetermined magnification are performed in a server, and data on the enlarged images created in the server in this manner is transmitted to the cellular phone.

Patent document 1: Japanese Unexamined Patent Publication No. 2005-316558

Patent document 2: Japanese Unexamined Patent Publication No. 2003-273971

SUMMARY OF THE INVENTION

Problem to be Solved by the Invention

However, what the above-described technique that divides an image to enlarge the divided images does is only to simply equally divide the entire area of the display screen on which the image is displayed to set the enlargement target areas, and then directly magnify an image within any of the enlargement target areas at the predetermined magnification. As a result, there arises a problem that, if successive characters (character string) are displayed on the display screen beyond a boundary line between the respective target regions, a part of the character string is not enlarged, and content of the character string is difficult to recognize, and therefore even if an image within a enlargement target area is enlarged, visibility is not improved.

The present invention is made in consideration of the above situations, and an object thereof is to provide a portable terminal device that when a part of an image displayed on a display screen is enlarged, enables content of the enlarged image to be easily visually recognized.

Means Adapted to Solve Problems

A portable terminal device according to a first aspect of the present invention includes: TV image generating means that, on the basis of a received TV broadcast wave, generates a TV image; an operation part including a plurality of operation keys that are two-dimensionally arranged in a matrix form; image enlarging means that, in a state where a plurality of enlargement target areas are preliminarily set as partial areas of the TV image, generates an enlarged TV image by, on a basis of an operation of any of the operation keys, enlarging an image within an enlargement target area preliminarily related to the operation key; display image generating means that, in a normal browsing mode, generates a display image including the TV image, and in an enlargement browsing mode, generates a display image including the enlarged TV image; and display means that displays the display image, and is configured such that the respective enlargement target areas respectively correspond in an arrangement order to the preliminarily related operation keys, and form overlap areas with their adjacent enlargement target areas.

According to such a configuration, in the case where an image within any of the enlargement target areas is enlarged and displayed, the enlargement target area is set to form an overlap area with an adjacent enlargement target area, and therefore a range of the enlargement target area can be made larger by an amount equal to the overlap area, as compared with the case of, as a conventional case, simply enlarging an image within an enlargement target area that is set by equally sectioning an entire area of an image displayed on a display screen. As a result, for example, in the case where a character string that is difficult to recognize in content in a current TV image state is present in the overlap area of the enlargement target area, the content of the character string becomes recognizable by specifying the enlargement target area including many of characters constituting the character string.

As the character string, scores in a relay broadcast of a sport such as baseball, football, or volleyball, character string indicating data on a player, a character string displayed in news, or the like is exemplified. Also, besides the character string, a finely patterned image or the like is exemplified.

Further, in the portable terminal device of the present invention, the respective enlargement target areas are set to respectively correspond in an arrangement order to the preliminarily related operation keys, so that a correspondence relationship between the enlargement target areas and the operation keys is easy to recognize, and therefore a user can easily specify any of the enlargement target areas.

A portable terminal device according to a second aspect of the present invention is, in addition to the configuration, configured such that the image enlarging means generates the enlarged TV image in an area smaller than an area in which the TV image is displayed, and the display image generating means superimposes the enlarged TV image on the TV image so as to leave a part of the TV image, and generates the display image having the enlarged TV image and the part of the TV image.

According to such a configuration, in the case where the enlarged TV image generated by enlarging the image within the enlargement target area is displayed by the display means, the part of the TV image, which is not enlarged, can be displayed around the enlarged TV image with the enlarged TV image being superimposed on the TV image having been displayed in the normal browsing mode, and therefore it can be easily determined in which part of the TV image an enlargement target area is enlarged.

A portable terminal device according to a third aspect of the present embodiment is, in addition to the configuration, configured such that on the basis of a pressing down operation of the operation key, the display image generating means generates the display image including the enlarged TV image for the enlargement browsing mode, whereas on the basis of a releasing operation of the operation key, the display image generating means generates the display image including the TV image for the normal browsing mode.

According to such a configuration, in the portable terminal device of the present invention, a user performs an operation of pressing down a predetermined operation key, and can thereby switch to the enlargement browsing mode to enlarge and display the part of the TV image, whereas the user releases a finger from the operation key having been pressed down to perform the releasing operation, and can thereby easily restore the enlargement browsing mode to the normal browsing mode.

A portable terminal device according to a fourth aspect of the present invention is, in addition to the configuration, configured such that the image enlarging means enlarges the enlargement target area to generate the enlarged TV image depending on a time period during which the operation key is subjected to the pressing down operation.

According to such a configuration, in the portable terminal device of the present invention, by keep pressing the operation key, the enlargement target area is changed so as to be enlarged, and an enlarged TV image different in an enlargement target area from an enlarged TV image having been displayed can be displayed on the display means. Specifically, by keep pressing the operation key, the enlargement target area having been set is enlarged to set a new enlargement target area having a different area size, and an image within the larger enlargement target area can be enlarged to display the new enlarged TV image. As a result, even if there occurs a case where, for example, in the enlarged TV image initially displayed on the display means, a character string or the like cannot yet be fully recognized because the character string or the like is in a state where an end part of the character string or the like is still cut off, content of the character string or the like becomes fully recognizable.

A portable terminal device according to a fifth aspect of the present invention is, in addition to the configuration, configured such that the image enlarging means increases an enlargement magnification for the enlargement target area to generate the enlarged TV image depending on a time period during which the operation key is subjected to the pressing down operation.

According to such a configuration, by keep pressing the operation key, the enlargement magnification upon enlargement of the enlargement target area is changed so as to be increased, and the enlarged TV image generated differently in enlargement magnification from an enlargement TV image having been displayed can be displayed by the display means. Specifically, by keep pressing the operation key, an enlargement magnification for the enlargement target area is set to be increased larger than the enlargement magnification for the enlarged TV image having been displayed, and the new enlarged TV image for which the enlargement magnification is increased can be displayed on the display means. As a result, even in the case where, for example, a character string or the like has a size still difficult to determine in the enlarged TV image initially displayed on the display means, by further increasing an enlargement magnification to display an enlarged TV image, content of the character string or the like becomes fully recognizable.

A portable terminal device according to a sixth aspect of the present invention is, in addition to the configuration, configured such that a display screen of the display means is rectangular shaped; a longer direction of the display screen is changed within a range of 90 degrees with respect to the operation part to enable switching to a vertically long display state or a horizontally long display state; switch detecting means that detects the switching of the display state of the display screen is provided; and the image enlarging means sets enlargement target area groups respectively corresponding to the display screen in the horizontally long display state and the vertically long display state, and on the basis of a result of the detection by the switch detecting means, selects one of the enlargement target area groups.

According to such a configuration, the enlargement target area groups respectively are set for TV images in the horizontally long display state and the vertically long display state, and therefore even if the display state of the display screen is switched, the enlargement target area at the same arrangement position in the TV image can be specified with the same key operation, and therefore an enlargement operation can be easily performed.

Effect of the Invention

According to the present invention, each of the enlargement target areas forms an overlap area with an adjacent enlargement target area, and therefore a range of the enlargement target area can be made larger, as compared with the case where, as a conventional case, an image within an enlargement target area set by simply dividing the entire area of an image displayed on a display screen is enlarged. As a result, even in the case where a part such as character string or the like, which is difficult to recognize in content in a current TV image state, is present in the overlap area of the enlargement target area, the content becomes recognizable by specifying the enlargement target area including most of the part.

Further, in the present invention, the respective enlargement target areas are set to respectively correspond in the arrangement order to the preliminarily related operation keys, so that the correspondence relationship between the enlargement target areas and the operation keys is easy to recognize, and therefore a user can easily specify any of the enlargement target areas, and operability can be improved.

DETAILED DESCRIPTION OF THE INVENTION

First Embodiment

Figure 1:
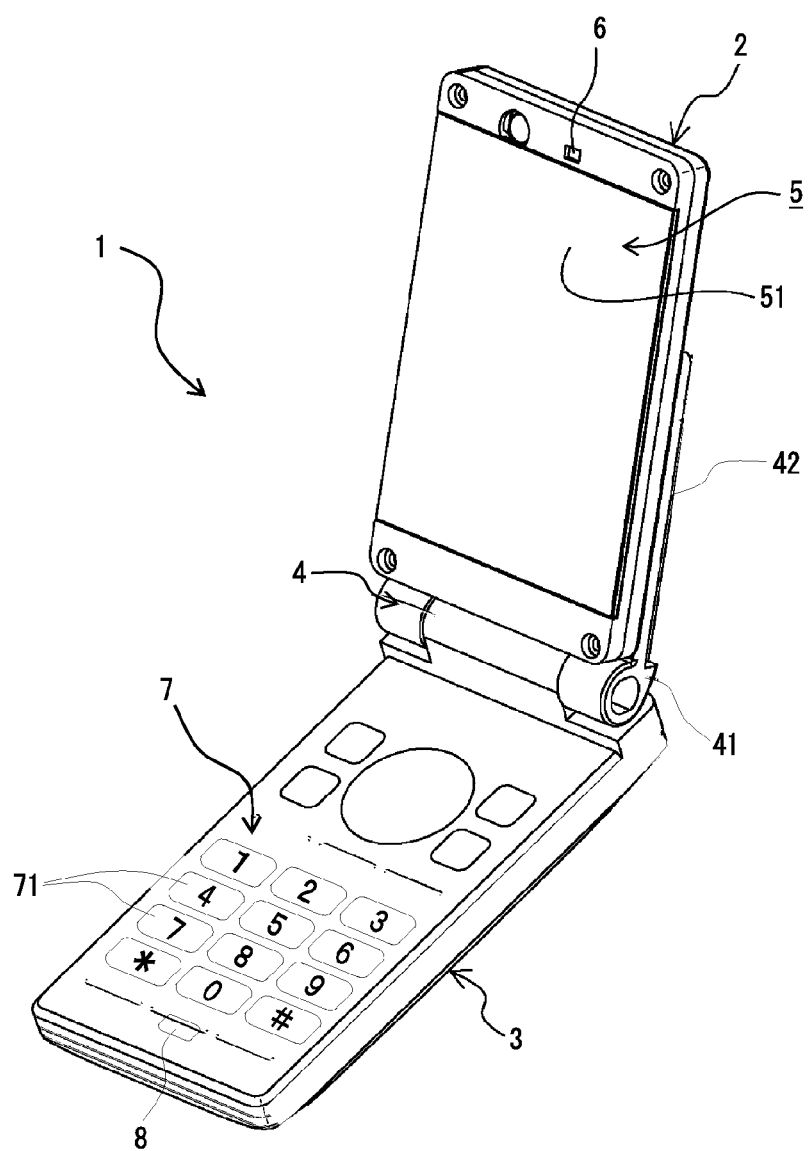
FIG. 1 is a perspective view illustrating an example of a cellular phone according to a first embodiment of the present invention, and illustrates a state where casings are expanded.

FIG. 1 is a perspective view illustrating an example of a cellular phone 1 according to a first embodiment of the present invention, and illustrates a state where casings are expanded. The cellular phone 1 is a so-called flip phone, in which a display casing 2 and an operation casing 3 respectively formed in rectangular shapes are connected to each other through a hinge part 4. Accordingly, the cellular phone 1 is adapted to be folded with respective main surfaces of the display casing 2 and the operation casing 3 facing to each other.

In the display casing 2, a display part 5 and a receiver 6 are arranged on the main surface that faces to the operation casing 3 in the folded state. The display part 5 serves as display means that displays a display image. Also, the display part 5 includes a liquid crystal display having a rectangular shaped display screen 51, and is arranged such that a longer direction thereof corresponds to that of the display casing 2. The receiver 6 is voice output means that is intended to output voice from an opposite side telephone set upon telephone conversation, and arranged at an end part of the display casing 2 on a side opposite to the hinge part 4.

In the operation casing 3, an operation part 7 and a transmitting microphone 8 are arranged on the main surface that faces to the display casing 2 in the folded state. The operation part 7 has a plurality of operation keys 71, and is adapted to be able to perform selection and decision (enter) operations with use of the operation keys 71. The transmitting microphone 8 is voice input means that inputs user's voice upon telephone conversation, and arranged at an end part of the operation casing 3 on a side opposite to the hinge part 4.

The hinge part 4 foldably connects between the display casing 2 and the operation casing 3 such that the respective main surfaces face to each other. Also, the hinge part 4 is configured by integrally forming a connecting part 41 rotatably connected to the operation casing 3 and a rectangular plate-like holding part 42 that is arranged with facing an outer surface of the display casing 2 and rotatably holds the display casing 2 in a horizontal plane. The display casing 2 is connected to a flat surface part of the holding part 42 rotatably around a rotary shaft (not illustrated) perpendicular to the display screen of the display part 5 with the outer surface thereof facing to the flat surface of the holding part 42 of the hinge part 4. Based on this, the display casing 2 is adapted to be rotatably held in the plane of the holding part 42 parallel to the display screen of the display part 5, and be able to rotate with keeping an inclination angle to the operation casing 3.

Figure 2:
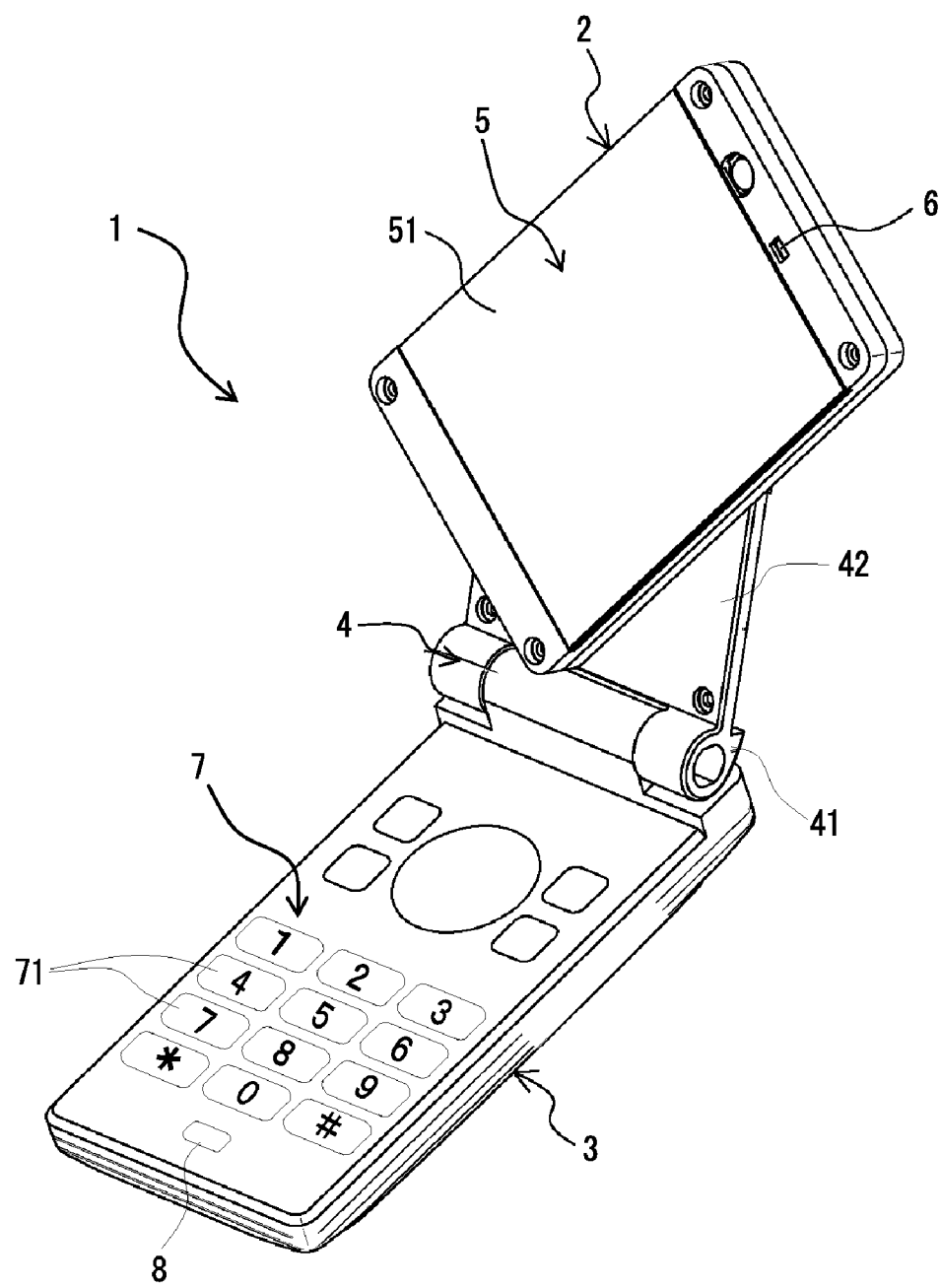
FIG. 2 is a perspective view illustrating a state where a display casing of the cellular phone in FIG. 1 is rotated, and illustrates the state where the display casing is rotated clockwise by approximately 45° from the state of FIG. 1 as viewed from the front.
Figure 3:
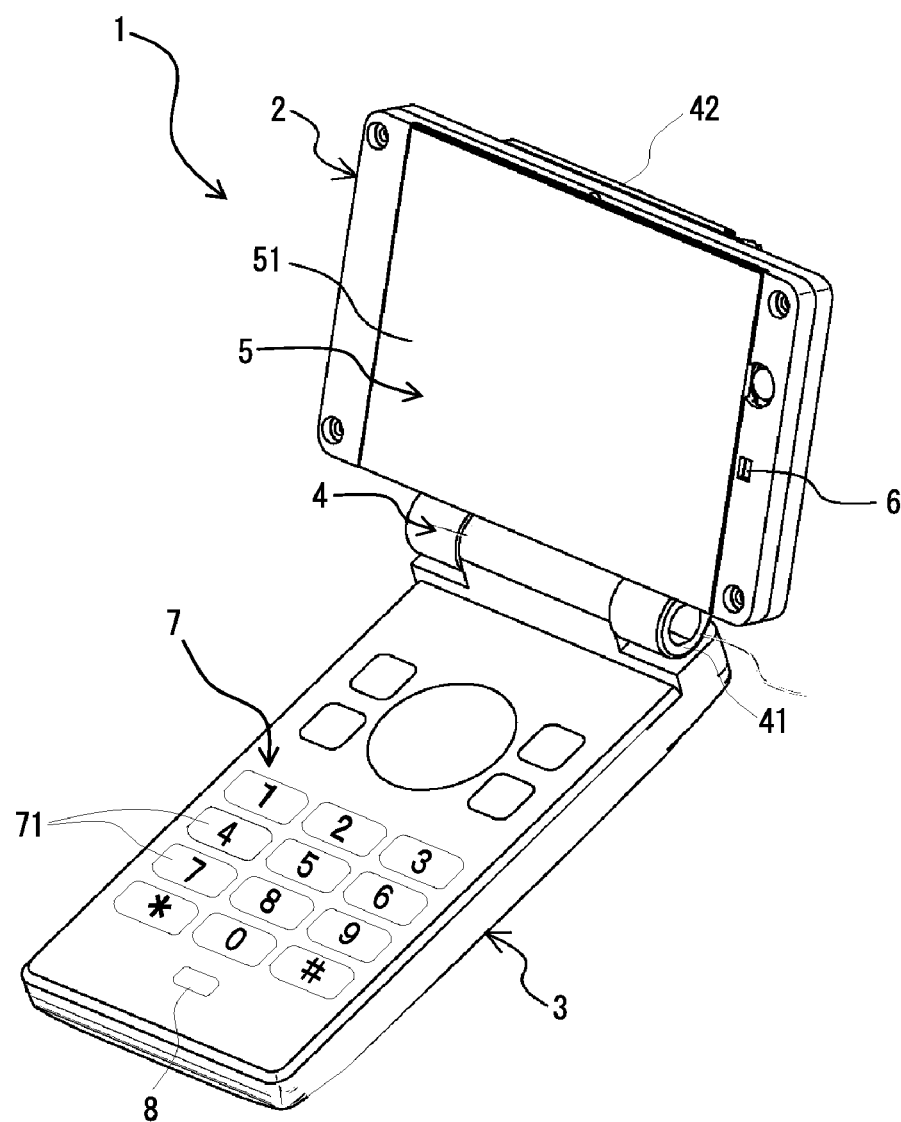
FIG. 3 is a perspective view illustrating a state where the display casing of the cellular phone in FIG. 1 is rotated, and illustrates the state where the display casing is rotated clockwise by 90° from the state of FIG. 1 as viewed from the front.

FIG. 2 is a perspective view illustrating a state where the display casing 2 of the cellular phone 1 in FIG. 1 is rotated, and illustrates the state where the display casing 2 is rotated clockwise by approximately 45° from the state of FIG. 1 as viewed from the front. FIG. 3 is a perspective view illustrating a state where the display casing 2 of the cellular phone 1 in FIG. 1 is rotated, and illustrates the state where the display casing 2 is rotated clockwise by 90° from the state of FIG. 1 as viewed from the front.

A user rotates, while holding the operation casing 3, the display casing 2 in the plane parallel to the display screen 51 of the display part 5 within an angle range of 90° with respect to the operation casing 3 to thereby switch the display screen 51 between a vertically long display state illustrated in FIG. 1 and a horizontally long display state illustrated in FIG. 3. On the display screen 51 in the vertically long display state illustrated in FIG. 1, an image is displayed with a longer direction of the display screen 51 being made vertical. On the other hand, on the display screen 51 in the horizontally long display state illustrated in FIG. 3, an image is displayed with a shorter direction of the display screen 51 being made vertical.

Figure 4:
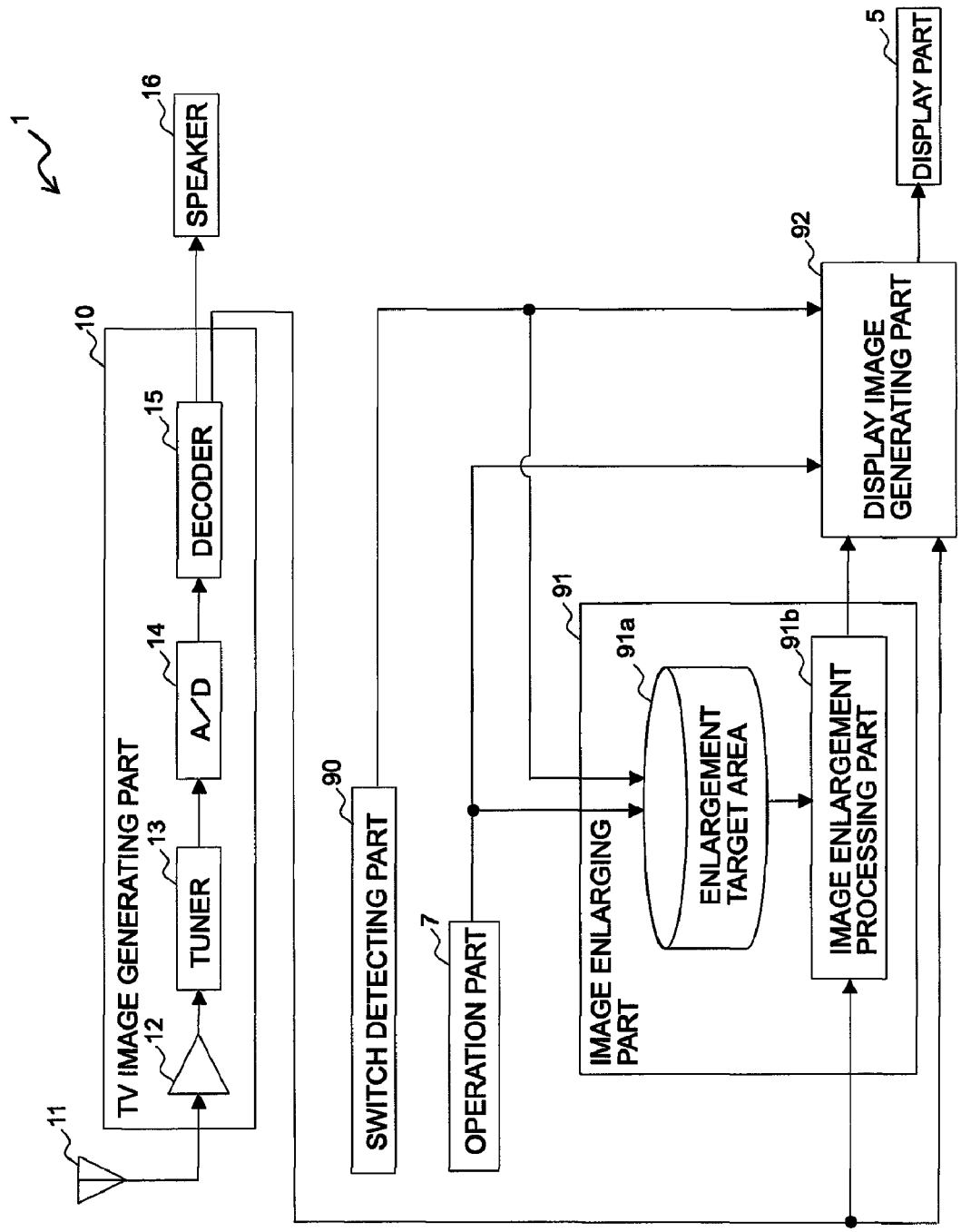
FIG. 4 is a block diagram illustrating a configuration of the cellular phone.

FIG. 4 is a configuration block diagram of the cellular phone 1. The cellular phone 1 includes an antenna 11, an amplifier 12, a tuner 13, an A/D converter 14, a decoder 15, a switch detecting part 90, an image enlarging part 91, a display image generating part 92, a display part 5, a speaker 16, and an operation part 7. In the present embodiment, the amplifier 12, the tuner 13, the A/D converter 14, and the decoder 15 constitute a TV image generating part (TV image generating means) 10.

The cellular phone 1 is adapted to receive a TV broadcast wave with the antenna 11, and by displaying an TV image based on the received TV broadcast wave on the display screen 51 of the display part 5 and also outputting TV voice corresponding to the TV image from the speaker 16, allow a TV broadcast to be watched.

A signal based on the TV broadcast wave received with the antenna 11 is inputted to the amplifier 12; then a TV broadcast wave corresponding to a specified channel number is extracted in the tuner 13; and an analog signal is converted to a digital signal with the A/D converter 14.

A channel number can be specified for the tuner 13 by operating the operation keys 71. At this time, by operating the operation keys 71 to input the channel number, the channel number can be directly specified; however, processing of sequentially specifying channel numbers for the tuner 13, i.e., a so-called channel search can also be performed until the TV broadcast wave is normally received.

The signal based on the TV broadcast wave, which is the digital signal into which the analog signal is converted in the A/D converter 14, is inputted to the decoder 15. The decoder 15 decodes the signal based on the TV broadcast wave to thereby generate data on the TV image and also data on the TV voice.

The present embodiment is adapted to, on the basis of the image data generated in the decoder 15, generate a display image including the TV image in the display image generating part 92, and display the display image on the display part 5. Also, the present embodiment is adapted to output the TV voice from the speaker 16 on the basis of the voice data generated in the decoder 15.

In the decoder 15 of the cellular phone 1, a digital TV broadcast can be received to generate not only a TV image or TV voice but also content data. The content data is inputted to the display image generating part 92, and then displayed on the display part 5. The cellular phone 1 is adapted such that the content data is displayed on the display part 5, and thereby the user can watch a data broadcast.

The content data includes a character string generated with use of a BML (Broadcast Markup Language) that is a language for data broadcast, and besides, image data, tag information, and the like. Note that the character string included in the content data is not limited to one generated with use of the BML, but may be one generated with use of the other language such as an HTML (Hyper Text Markup Language).

In addition, when the cellular phone 1 is used to make a telephone conversation with another telephone set, a wireless signal is transmitted/received to/from a base station through an antenna, although not illustrated. Also, if the cellular phone 1 receives character information such as an electronic mail from the base station through the antenna, it is adapted to display the character information on the display part.

Further, the present embodiment is adapted such that, when the display casing 2 of the cellular phone 1 is rotated with respect to the operation casing 3, the switch detecting part 90 detects whether the display screen 51 is in the horizontally long display state illustrated in FIG. 5(a) or the vertically long display state illustrated in FIG. 5(b). The present embodiment is also adapted such that a result of the display state detected by the switch detecting part 90 is inputted to the display image generating part 92.

Note that the display screen 51 in the horizontally long display state is, as illustrated in FIG. 5(a), sectioned into a pictogram display area 51a and a TV image display area 51b. Also, the display screen 51 in the vertically long display state is, as illustrated in FIG. 5(b), sectioned into a pictogram display area 51a, TV image display area 51b, and data broadcast display area 51c.

Also, the image enlarging part 91 serves as image enlarging means that enlarges a part of a TV image, and includes a memory 91a that stores an enlargement target area, and an image enlargement processing part 91b that, on the basis of the enlargement target area stored in the memory 91a, enlarges the part of the TV image to generate an enlarged TV image.

Figure 5:
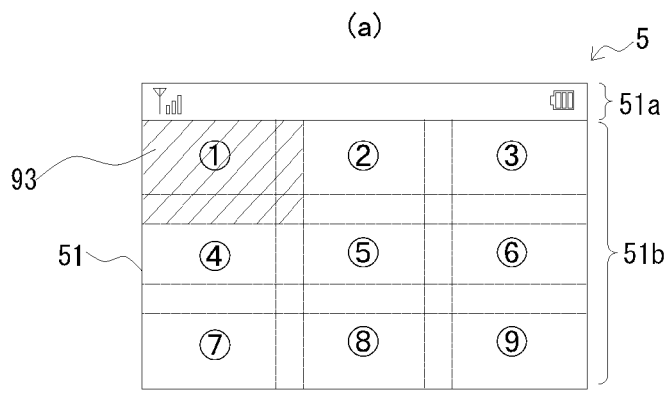
FIG. 5 is a diagram illustrating an arrangement state of enlargement target areas set on a display screen, and a positional relation ship between the enlargement target areas and operation keys in the first embodiment of the present invention.
Figure 5:
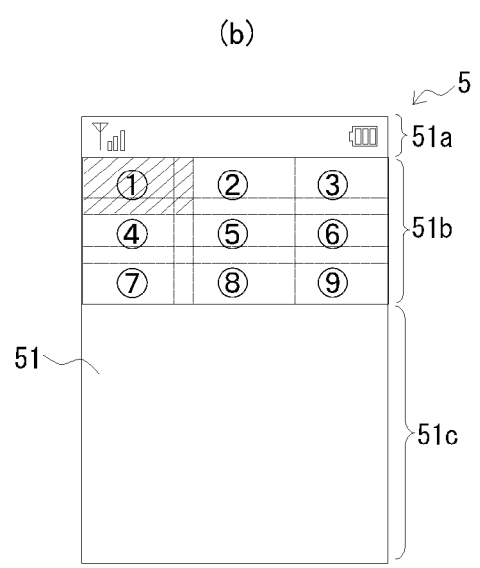
Figure 5:
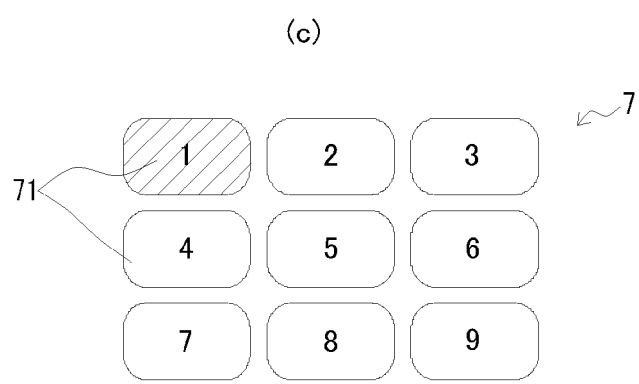

In the memory 91a of the image enlarging part 91, as illustrated in FIG. 5, the enlargement target area 93 serving as a partial area of the TV image is stored, and a plurality of the enlargement target areas 93 set to have the same arrangement order as the operation keys 71 are stored. In the present embodiment, the nine enlargement target areas 93 are set corresponding to an arrangement order of numerical keys (1 to 9 keys) among the operation keys 71 for the TV image display area 51b of the display screen 51. Further, each of the enlargement target areas 93 is set so as to form an overlap area with an adjacent enlargement target area.

In the memory 91a, an operation key 71 and the enlargement target area respectively having corresponding arrangement positions are related to each other, and if any of the operation keys 71 in the operation part 7 is specified, an enlargement target region 93 having a corresponding arrangement position will be specified. Then, the specified enlargement target area 93 is inputted to the image enlargement processing part 91b.

Also, in the memory 91a, as illustrated in FIGS. 5(a) and (b), enlargement target area groups respectively corresponding to display images in the horizontally long display state and the vertically long display state are stored. The memory 91a is adapted to select, on the basis of a result of detection by the switch detecting part 90, one of the enlargement target area group related to the horizontally long display state or that related to the vertically long display state. Each of the enlargement target area groups includes the nine enlargement target areas related to the nine numerical keys. As described, in the present embodiment, the operation keys 71 and the enlargement target areas 93 are related to each other, and also when the relationship is established, the enlargement target area group related to the horizontally long display state and that related to the vertically long display state are set.

The image enlargement processing part 91b enlarges, on the basis the enlargement target area 93 specified by the operation of the operation key 71, an image within the enlargement target area 93 preliminarily related to the operation key 71 to generate an enlarged TV image. Data on the enlarged TV image is inputted to the display image generating part 92. In the present embodiment, an enlargement magnification for the enlarged TV image is set such that when the enlarged TV image is displayed on the display screen 51, it becomes smaller in area than the TV image display area 51*b*. Note that the enlargement magnification may be set such that the enlarged TV image is displayed over the entire area of the TV image display area 51*b*.

The display image generating part 92 serves as display image generating means that generates a display image to be displayed on the display screen 51. The display image generating part 92 performs processing of generating the display image including a TV image in a normal browsing mode, or in an enlargement browsing mode, generating the display image including an enlarged TV image. The normal browsing mode refers to a state where the entire TV image is displayed in the TV image display area 51*b* of the display screen 51. Note that the display image generated in the display image generating part 92 includes not only the TV image but also a pictogram display image and a content data image.

Meanwhile, when a user watches a TV image in the normal browsing mode, he/she may feel a desire to enlarge and display a partial image of the TV image. The present embodiment is adapted such that the user keeps pressing an operation key 71 corresponding to an enlargement target area 93 the user has a desire to enlarge, and thereby the normal browsing mode is changed to the enlargement browsing mode. When the enlargement browsing mode appears, the display image generating part 92 performs the processing of generating a display image so as to include an enlarged TV image generated in the image enlargement processing part 91*b*.

Also, in the enlargement browsing mode, by keeping pressing the operation key 71, the following processing is performed. First, the enlargement target area 93 specified by the operation key 71 is inputted from the memory 91*a* of the image enlarging part 91 to the image enlargement processing part 91*b*, and the image enlargement processing part 91*b* enlarges an image within the specified enlargement target area 93 to generate an enlarged TV image. The display image generating part 92 receives data on the enlarged TV image from the image enlargement processing part 91*b*, and generates a display image to be displayed on the display screen 51 such that the enlarged TV image is included in the TV image display area 51*b*. Then, the display image including the enlarged TV image is displayed on the display screen 51.

Further, the present embodiment is adapted such that by releasing a finger from the operation key 71 having been kept pressing to set the operation key 71 free in the enlargement browsing mode, the enlargement browsing mode immediately returns to the normal browsing mode in which the entire TV image is displayed. That is, when the finger is released from the operation key 71 having been kept pressing, an enlarged TV image is not generated in the image enlarging part 91, but a display image including the above TV image for the normal browsing mode is generated in the display image generating part 92, and the enlargement browsing mode returns to the normal browsing mode in which the entire TV image is displayed on the display screen 51.

In addition, the display image generating part 92 further performs processing of generating a display image to be displayed on the display screen 51 in the horizontally or vertically long display state, too. The display image suited to any of the display states of the display screen 51 is generated on the basis of a result of the detection by the switch detecting part 90.

Next, the nine enlargement target areas 93 set for the TV image display area 51*b* of the display screen 51 in each of the horizontally long display state and the vertically long display state in the present embodiment are specifically described on the basis of FIG. 5.

First, each of the enlargement target areas 93 (Nos. [1], [3], [7], and [9]) at the four corners is set to overlap with vertically and horizontally adjacent two enlargement target areas along entire sides thereof, and with an obliquely adjacent enlargement target area at a corner part thereof. For example, the No. [1] enlargement target area is set to overlap with the horizontally and vertically adjacent enlargement target areas (Nos. [2] and [4] enlargement target areas) along entire sides thereof, and with the adjacent central enlargement target area (No. [5] enlargement target area) at a corner part thereof. Note that, in FIG. 5(*a*), an area indicated by hatching is the No. [1] enlargement target area 93.

Also, each of the Nos. [2], [4], [6], and [8] enlargement target areas is set to overlap with vertically and horizontally adjacent three enlargement target areas respectively along entire sides thereof, and with obliquely adjacent two enlargement target areas at corner parts thereof. The No. [5] enlargement target area that is at the center is set to overlap with the obliquely adjacent four enlargement target areas at the four corners thereof, and with the vertically and horizontally adjacent four enlargement target areas along entire sides thereof.

Next, specific processing of enlarging an image within a predetermined enlargement target area with respect to a TV image in the horizontally long display state is described on the basis of FIGS. 6 to 11. By specifying an operation key 71 indicated by hatching in (b) of each of the diagrams, an enlargement target area 93 of the display screen 51, which is indicated by hatching in (a) of each of the diagrams, is specified, and for the enlargement target area 93, an enlarged TV image is generated. A state in which the enlarged TV image is displayed on the display screen is illustrated in (c) of each of the diagrams. Also, (a) of each of the diagrams illustrates a state where a TV broadcast is received to display a TV image in the TV image display area 51*b* of the display screen 51. In the present embodiment, there is illustrated a state where the TV image having a plurality of character strings is displayed.

Also, in the present embodiment, when the image enlarging part 91 generates the enlarged TV image, it generates the enlarged TV image at an enlargement magnification that produces an area smaller than the area in which the TV image is displayed. Then, the display image generating part 92 superimposes the enlarged TV image on the TV image so as to leave a part of the TV image, and thereby generates a display image having the enlarged TV image and the part of the TV image. Accordingly, in the TV image display area 51*b* of the display screen 51, the image is displayed with the enlarged TV image being superimposed on the TV image, and the enlarged TV image is enlarged and displayed on the basis of a position of the specified enlargement target area 93 on the display screen 51. As a result, on the basis of a position at which the enlarged TV image in the TV image display area 51*b* is displayed, it can be easily determined which of the enlargement target areas 93 in the TV image is enlarged.

Figure 6:
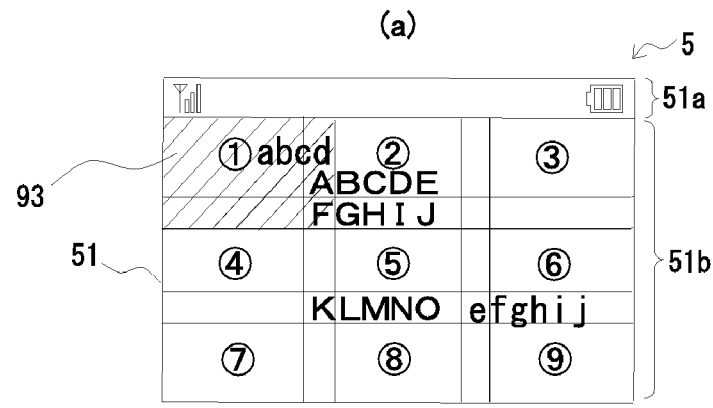
FIG. 6 is an explanatory diagram of processing of enlarging an image within a No. [1] enlargement target area in the first embodiment of the present invention.
Figure 6:
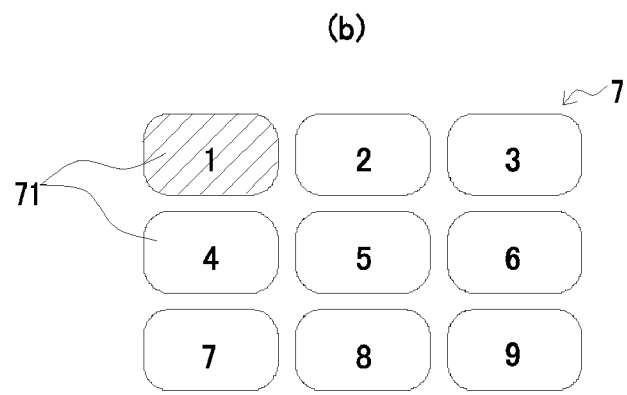
Figure 6:
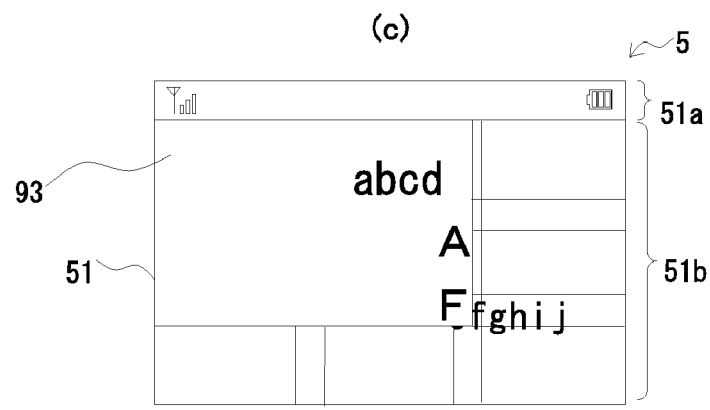

First, there is described a case where, as illustrated in FIG. 6, the No. [1] enlargement target area 93 is specified with the No. [1] operation key 71 to display an enlarged TV image on the display screen 51. In FIG. 6(*a*), in the No. [1] enlargement target area 93, characters "a", "b", "c", "d", "A", and "F" are displayed. In an overlap area with the adjacent No. [2] enlargement target area 93, the characters "d", "A", and "F" are displayed, and in an overlap area with the adjacent No. [5] enlargement target area 93, the character "F" is displayed.

When the No. [1] enlargement target area 93 is specified with the No. [1] operation key 71, as illustrated in FIG. 6(c), the enlarged TV image in which an image within the No. [1] enlargement target area 93 is enlarged is displayed in an upper left part within the TV image display area 51b. In the enlarged TV image, the character string "abcd" is entirely displayed because of the character "d" displayed in the overlap area with the adjacent No. [2] enlargement target area 93, and therefore content of the character string is fully recognized.

Figure 7:
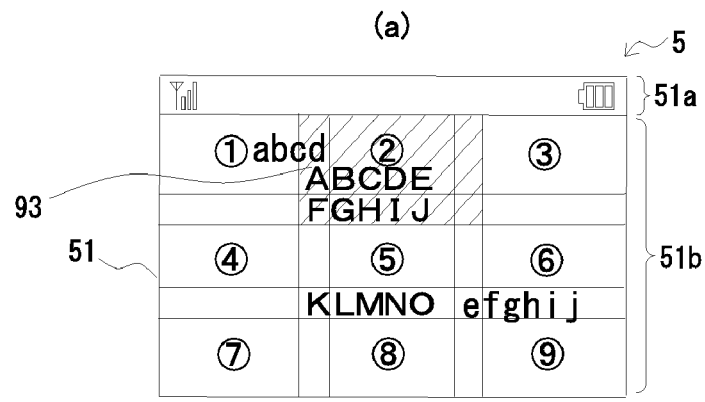
FIG. 7 is an explanatory diagram of processing of enlarging an image within a No. [2] enlargement target area in the first embodiment of the present invention.
Figure 7:
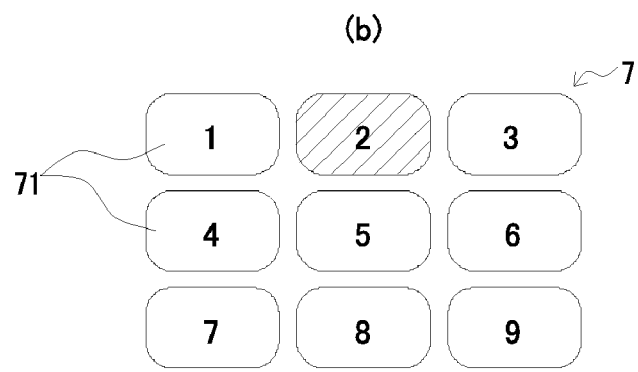
Figure 7:
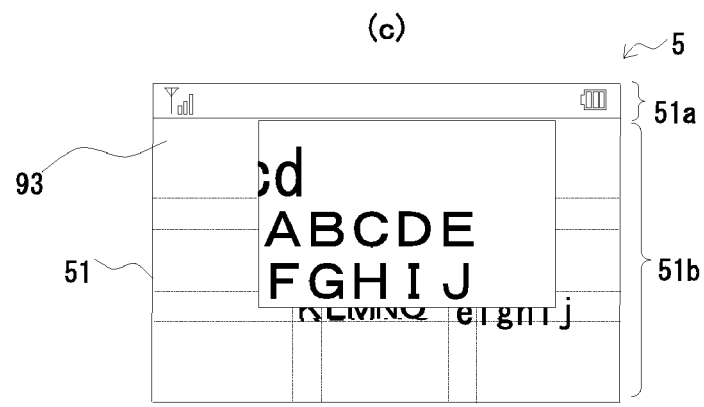

Next, as illustrated in FIG. 7, there is described a case where the No. [2] enlargement target area 93 is specified with the No. [2] operation key 71 to display an enlarged TV image on the display screen 51. In FIG. 7(a), in the No. [2] enlargement target area 93, characters "d", "A", "B", "C", "D", "E", "F", "G", "H", "I", and "J" are displayed. In the overlap area with the adjacent No. [1]enlargement target area 93, the characters "d", "A", and "F" are displayed, and in an overlap area with the adjacent No. [5] enlargement target area 93, the characters "F", "G", "H", "I", and "J" are displayed. When the No. [2] enlargement target area 93 is specified with the No. [2] operation key 71, as illustrated in FIG. 7(c), in a horizontal central upper part within the TV image display area 51b, the enlarged TV image in which an image within the No. [2] enlargement target area 93 is enlarged is displayed. In the enlarged TV image, the character strings "ABCDE" and "FGHIJ" are entirely displayed because of the characters "A" and "F" displayed in the overlap area with the adjacent No. [1] enlargement target area 93, and therefore content of each of the character strings can be fully recognized.

Figure 8:
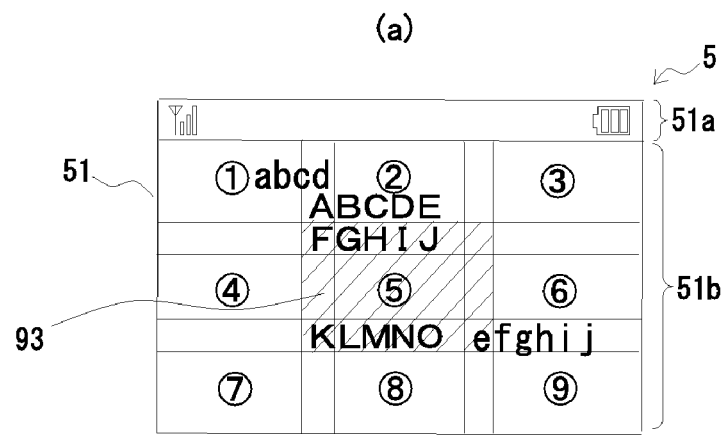
FIG. 8 is an explanatory diagram of processing of enlarging an image within a No. [5] enlargement target area in the first embodiment of the present invention.
Figure 8:
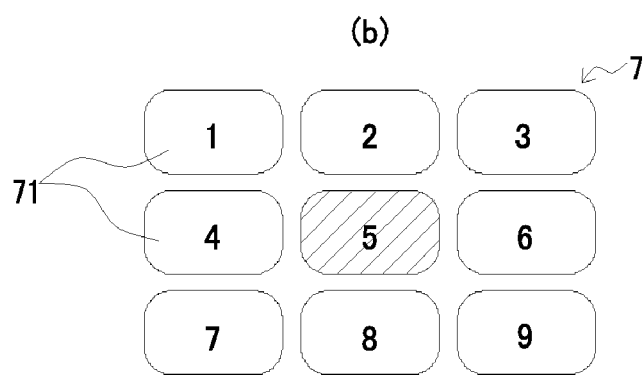
Figure 8:
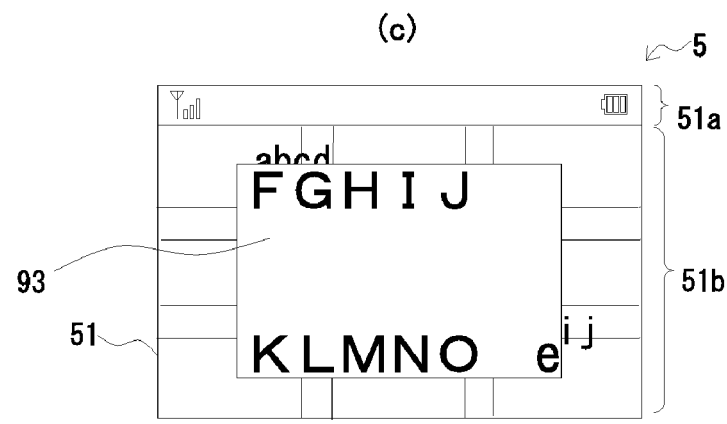

Next, as illustrated in FIG. 8, there is described a case where the No. [5] enlargement target area 93 is specified with the No. [5] operation key 71 to display an enlarged TV image on the display screen 51. In FIG. 8(a), in the No. [5] enlargement target area 93, characters "F", "G", "H", "I", "J", "K", "L", "M", "N", "O", and "e" are displayed. In the overlap area with the adjacent No. [2] enlargement target area 93, the characters "F", "G", "H", "I", and "J" are displayed, and in an overlap area with the adjacent No. [8] enlargement target area 93, the characters "K", "L", "M", "N", "O", and "e" are displayed. Further, in an overlap area with the adjacent Nos. [1] and [4] enlargement target areas 93, the character "F" is displayed; in an overlap area with the adjacent Nos. [4] and [7] enlargement target areas 93, the character "K" is displayed; and in an overlap area with the adjacent Nos. [6] and [9] enlargement target areas 93, the character "e" is displayed. When the No. [5] enlargement target area 93 is specified with the No. [5] operation key 71, as illustrated in FIG. 8(c), the enlarged TV image in which an image within the No. [5] enlargement target area 93 is enlarged is displayed in the central part within the TV image display area 51b. The character strings "F, G, H, I, and J", and "K, L, M, N, and O" are entirely displayed in the enlarged TV image because of the characters displayed in the overlap areas with the adjacent Nos. [2] and [8] enlargement target areas 93, and therefore content of each of the character strings can be fully recognized.

Figure 9:
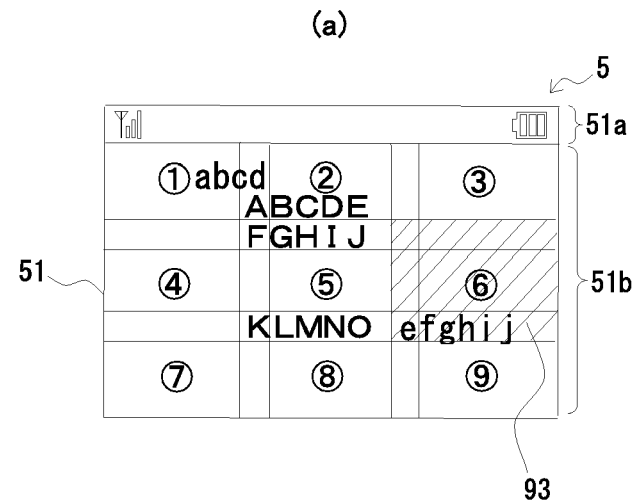
FIG. 9 is an explanatory diagram of processing of enlarging an image within a No. [6] enlargement target area in the first embodiment of the present invention.
Figure 9:
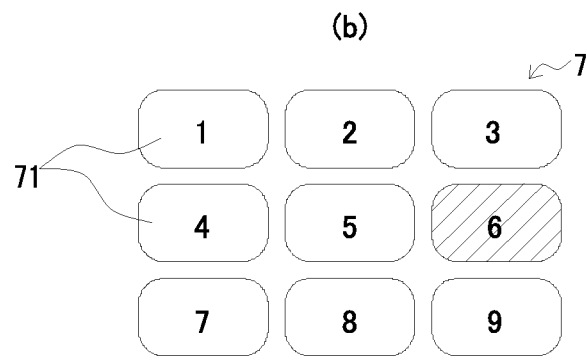
Figure 9:
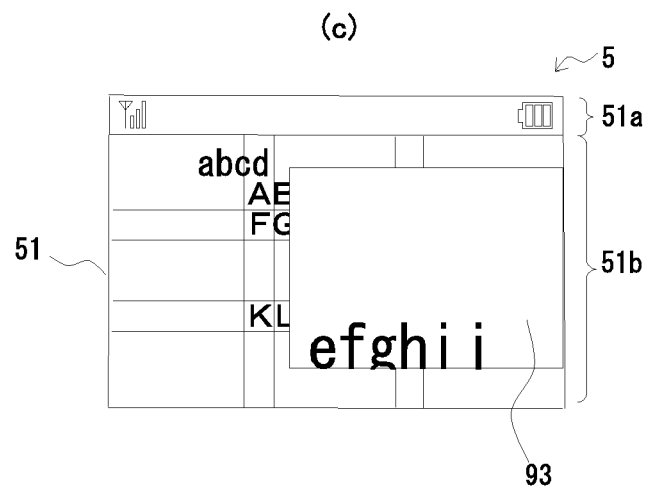

Next, as illustrated in FIG. 9, there is described a case where the No. [6] enlargement target area 93 is specified with the No. [6] operation key 71 to display an enlarged TV image on the display screen 51. In FIG. 9(a), in the No. [6] enlargement target area 93, characters "e", "f", "g", "h", "i", and "j" are displayed. In an overlap area with the adjacent No. [9] enlargement target area 93, the characters "e", "f", "g", "h", "i", and "j" are displayed, and in an overlap area with the adjacent Nos. [5] and [8] enlargement target areas 93, the character "e" is displayed. When the No. [6] enlargement target area 93 is specified with the No. [6] operation key 71, as illustrated in FIG. 9(c), in a right-hand side vertical central part within the TV image display area 51b, the enlarged TV image in which an image within the No. [6] enlargement target area 93 is enlarged is displayed. In the enlarged TV image, the character string "efghij" is substantially entirely displayed because of the characters displayed in the overlap area with the adjacent No. [9] enlargement target area 93, and therefore content of the character string can be fully recognized.

Figure 10:
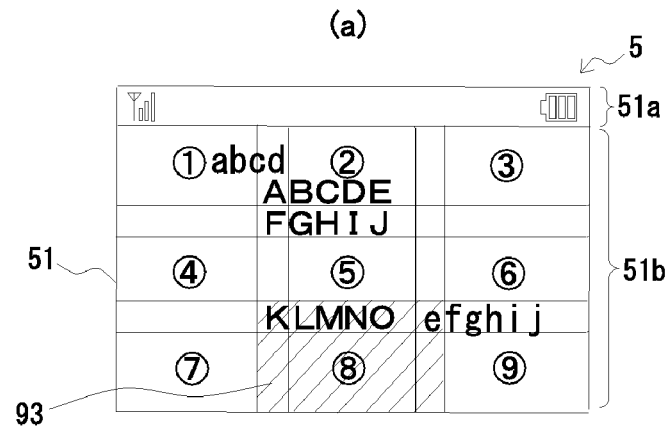
FIG. 10 is an explanatory diagram of processing of enlarging an image within a No. [8] enlargement target area in the first embodiment of the present invention.
Figure 10:
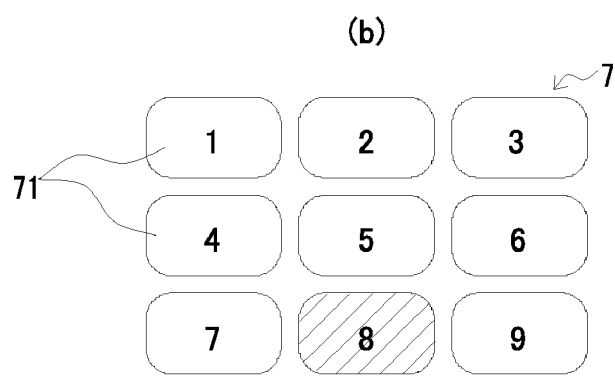
Figure 10:
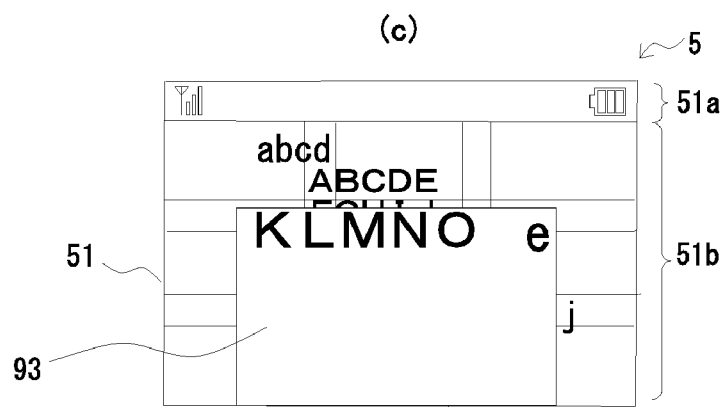

Next, as illustrated in FIG. 10, there is described a case where the No. [8] enlargement target area 93 is specified with the No. [8] operation key 71 to display an enlarged TV image on the display screen 51. In FIG. 10(a), in the No. [8] enlargement target area 93, characters "K", "L", "M", "N", "O", and "e" are displayed. In the overlap area with the adjacent No. [5] enlargement target area 93, the characters "K", "L", "M", "N", "O", and "e" are displayed; the character "K" is displayed in the overlap area with the adjacent Nos. [4] and [7] enlargement target areas 93; and the character "e" is displayed in the overlap area with the adjacent Nos. [6] and [9] enlargement target areas 93. When the No. [8] enlargement target area 93 is specified with the No. [8] operation key 71, as illustrated in FIG. 10(c), in a horizontal central lower part within the TV image display area 51b, the enlarged TV image in which an image within the No. [8] enlargement target area 93 is enlarged is displayed. In the enlarged TV image, the character string "KLMNO" is entirely displayed because of the characters displayed in the overlap area with the adjacent No. [5] enlargement target area 93, and therefore the content of the character string can be fully recognized.

Figure 11:
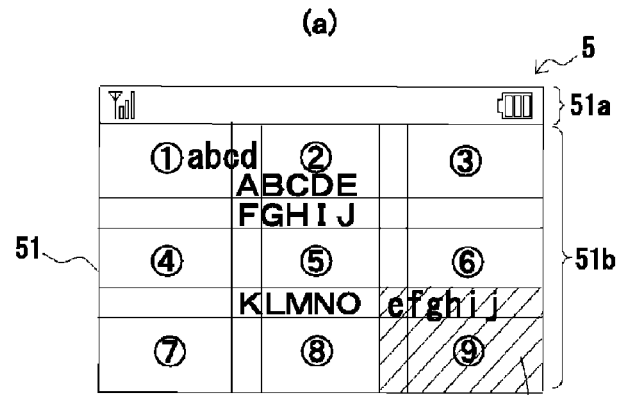
FIG. 11 is an explanatory diagram of processing of enlarging an image within a No. [9] enlargement target area in the first embodiment of the present invention.
Figure 11:
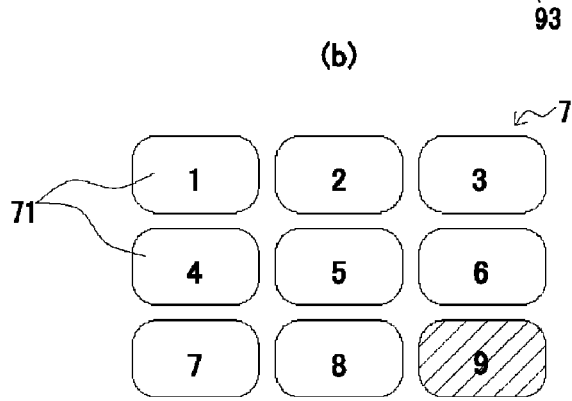
Figure 11:
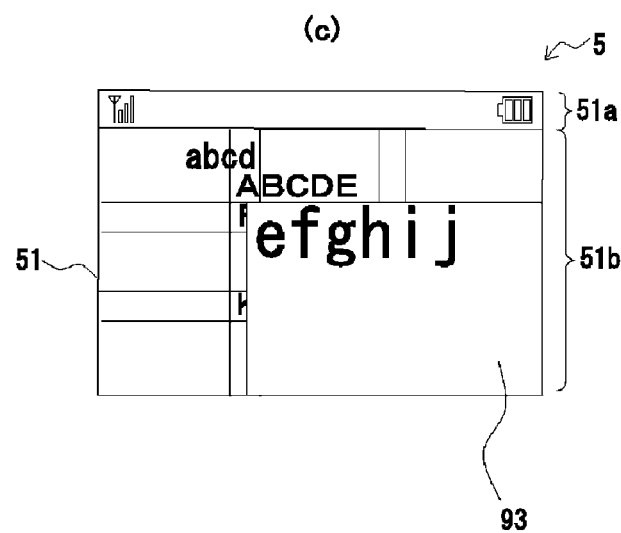

Finally, as illustrated in FIG. 11, there is described a case where the No. [9] enlargement target area 93 is specified with the No. [9] operation key 71 to display an enlarged TV image on the display screen 51. In FIG. 11(a), in the No. [9] enlargement target area 93, the characters "e", "f", "g", "j", "i", and "j" are displayed. In the overlap area with the adjacent No. [6] enlargement target area 93, the characters "e", "f", "g", "j", "i", and "j" are displayed, and the character "e" is displayed in the overlap area with the adjacent Nos. [5] and [8] enlargement target areas 93. When the No. [9] enlargement target area 93 is specified with the No. [9] operation key 71, as illustrated in FIG. 11(c), in a right-hand side lower part within the TV image display area 51b, the enlarged TV image in which an image within the No. [9] enlargement target area 93 is enlarged is displayed. In the enlarged TV image, the character string "efghij" is entirely displayed because of the overlap area with the adjacent No. [6] enlargement target area 93, and therefore the content of the character string can be fully recognized.

In the TV image illustrated in FIGS. 6 to 11, the content of the character string "abcd" can be recognized by enlarging the image within the No. [1] enlargement target area. The content of the character string "ABCDE" can be recognized by enlarging the image within the No. [2] enlargement target area. The content of the character string "FGHIJ" can be recognized by enlarging the image within any of the No. [2] or [5] enlargement target area. The content of the character string "KLMNO" can be recognized by enlarging the image within any of the No. [5] or [8] enlargement target area. The content of the character string "efghij" can be recognized by enlarging the image within any of the No. [6] or [9] enlargement target area. As described, an overlap area is formed with an adjacent enlargement target area, and therefore in a plurality of enlargement target areas, content of the same character string can be recognized, and only by switching specification of an operation key, an image within an adjacent enlargement target area can be enlarged to display an enlarged TV image, and therefore content of a character string is easy to recognize.

Figure 12:
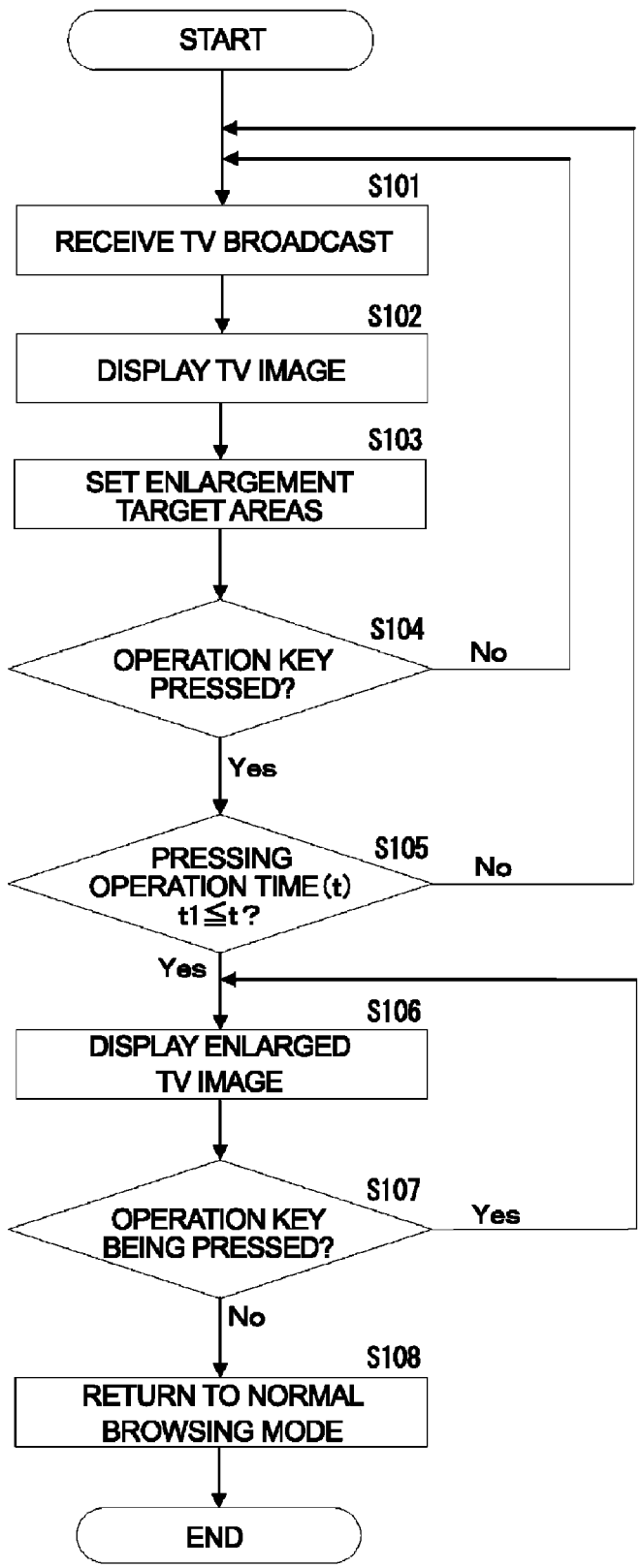
FIG. 12 is a flowchart illustrating an example of processing for enlarging and displaying a part of a TV image in the first embodiment of the present invention.

FIG. 12 is a flowchart illustrating processing of receiving a TV broadcast with the display screen being in the horizontally long display state; changing from the normal browsing mode in which a TV image is displayed on the display screen to the enlargement browsing mode; and enlarging and displaying a part of the image.

When the TV broadcast is received in the horizontally long display state (Step S101), the TV image is displayed on the display screen (Step S102). A state of the Step S102 is the normal browsing mode. When the TV image is displayed on the display screen, the nine enlargement target areas are set for the TV image display area of the display screen as illustrated in FIG. 5(a) (Step S103).

In the display image generating part, it is determined whether or not a predetermined operation key has been pressed (Step S104). If it is determined that the operation key has been pressed (Yes in Step S104), it is further determined whether or not a pressing operation time (t) of the operation key has passed a predetermined time period or more (t1≦t) (Step S105). If it is determined in Step S104 that the operation key is not pressed (No in Step S104), the flow returns to Step S102 where a display image including the entire TV image is generated to keep the normal browsing mode without enlarging the image.

If the pressing operation time (t) of the operation key has passed the predetermined time period or more (t1≦t) (Yes in Step S105), the image enlarging part generates an enlarged TV image for an enlargement target area specified by the operation key, and as illustrated in FIGS. 6 to 11(c), a display image including the enlarged TV image, which is generated in the display image generating part, is displayed on the display screen (Step S106). On the other hand, if the pressing operation time does not reach the predetermined time period (No in Step S105), the flow returns to Step S102 where the normal browsing mode in which the entire TV image is displayed on the display screen is kept.

Then, the display image generating part determines whether or not the same operation key is kept pressing (Step S107). If the operation key is kept pressing without releasing a finger, the flow returns to Step S106 where the enlargement browsing mode in which the enlarged TV image is displayed is kept. On the other hand, if the operation key is not pressed, it is determined that the operation key has been subjected to a releasing operation (No in Step S107), and the flow returns to Step S102 where the enlargement browsing mode returns to the normal browsing mode in which the entire TV image, which is not enlarged, is displayed on the display screen.

The present embodiment is adapted such that, on the basis of a pressing down operation of an operation key in the operation part performed by a used, an image within an enlargement target area corresponding to the operation key being pressed down is enlarged to display an enlarged TV image. At this time, the enlargement target area is set to form an overlap area with an enlargement target area adjacent thereto, and therefore larger in area than an enlargement target area formed by simply sectioning with boundary lines. As a result, a range displayed within an enlargement target area corresponding to a part the user has a desire to check becomes larger correspondingly, and therefore content of the part becomes easy to recognize.

Second Embodiment

Figure 13:
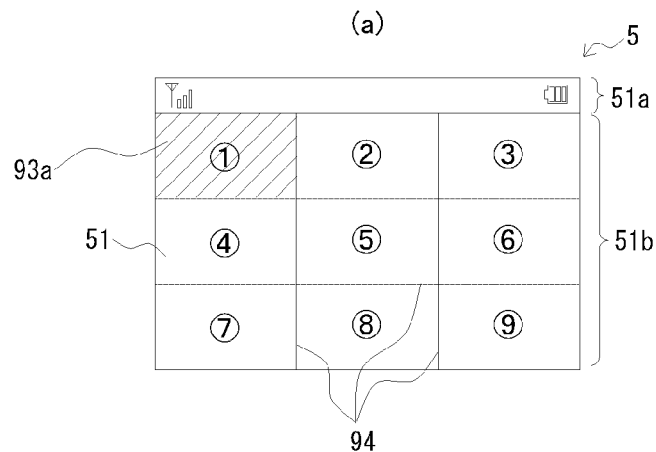
FIG. 13 is a diagram illustrating an arrangement state of enlargement target areas set on a display screen, and a positional relation ship between the enlargement target areas and the operation keys in a second embodiment of the present invention.
Figure 13:
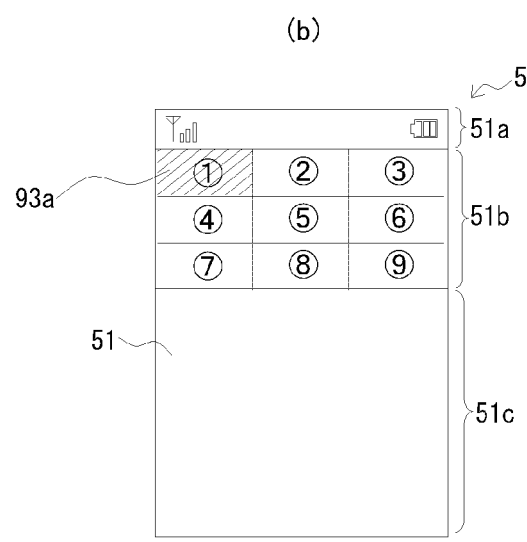
Figure 13:
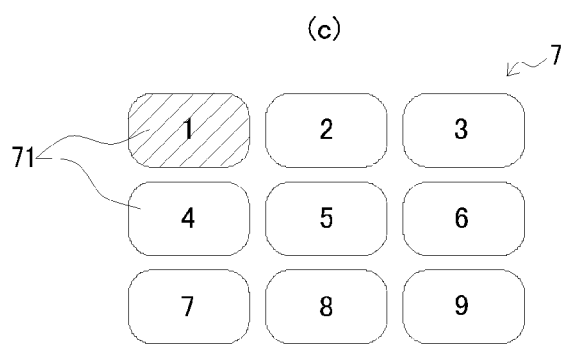

In the first embodiment, the nine enlargement target areas are set for the TV image display area of the display screen, and each of the enlargement target areas is adapted to form overlap areas with adjacent enlargement target areas. On the other hand, in a second embodiment, as illustrated in FIGS. 13(a) and (b), a TV image display area is equally sectioned by boundary lines 94 to set enlargement target areas. In the present embodiment, a structure of a cellular phone to be used is the same as that in the above-described first embodiment, but a method for setting the enlargement target areas, and a processing method for enlarging the enlargement target areas are different from those in the first embodiment. In addition, the same components are denoted by the same symbols to omit description thereof.

The present embodiment is adapted such that an image enlarging part 91 sets an enlargement target area group for the display screen in each of the horizontally and vertically display states as illustrated in FIGS. 13(a) and (b), and on the basis of a result of detection by a switch detecting part 90, selects one of the enlargement target area group related to the horizontally long display state or the enlargement target area group related to the vertically long display state. Each of the enlargement target groups includes the nine enlargement target areas 93a related to nine numerical keys, and the TV image display area 51b of the display screen 51 is sectioned by the boundary lines 94 to set the respective enlargement target areas 93a. Also, in the present embodiment, the operation keys 71 and the enlargement target areas 93a are related to each other, and when the relationship is established, the enlargement target area group related to the horizontally long display state, and that related to the vertically long display state are set, so that operability upon specification of an enlargement target area 93 with a corresponding operation key 71 can be improved.

Further, the present embodiment is also adapted such that, when any of the operation keys 71 remains pressed, the enlargement browsing mode appears, whereas when a finger is released from the operation key 71, the enlargement browsing mode returns to the normal browsing mode.

Figure 14:
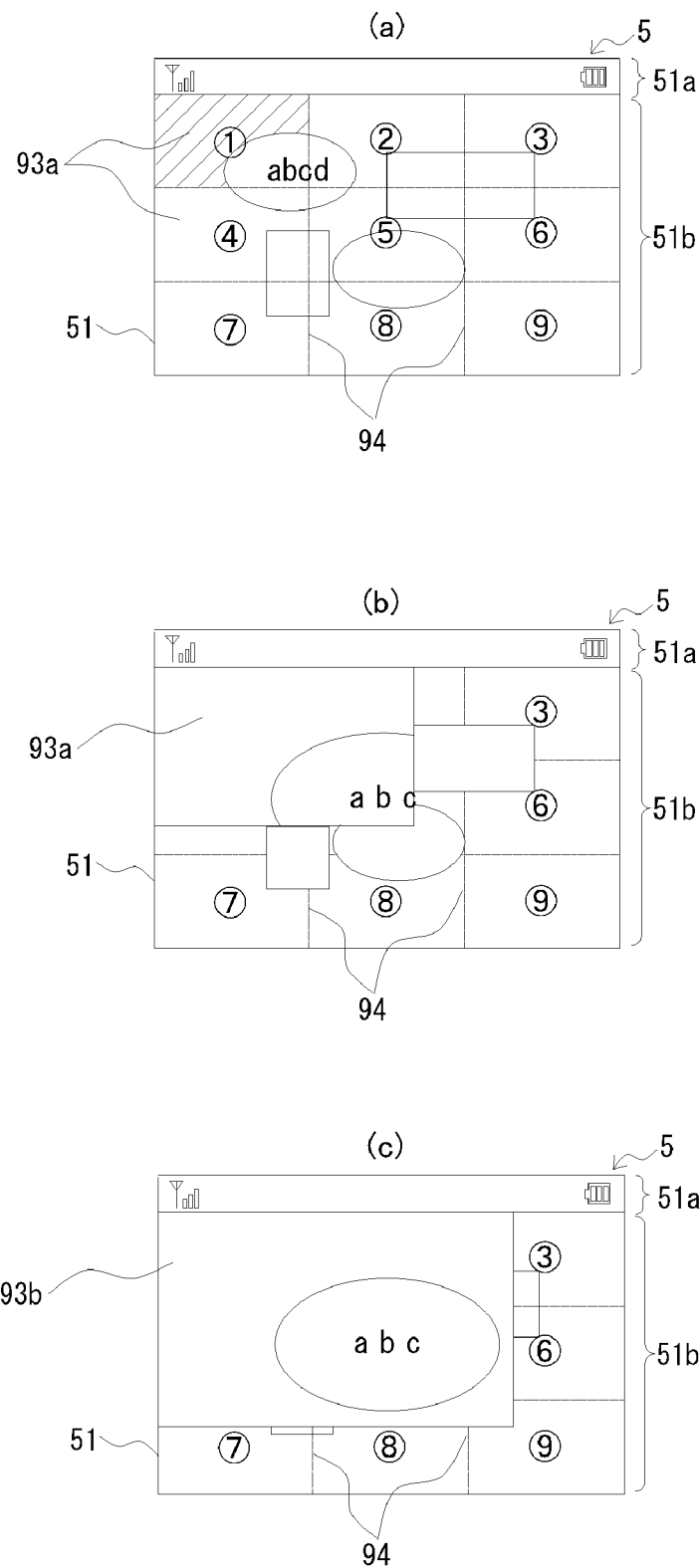
FIG. 14 is an explanatory diagram of processing of enlarging an image within an enlargement target area in the second embodiment of the present invention.

Image processing in the enlargement browsing mode in the present embodiment is described on the basis of FIG. 14. FIG. 14 is a diagram illustrating an example of an aspect in which a TV broadcast is received, and a TV image is displayed on the display screen 51 in the horizontally long display state. Also, in the present embodiment, in the TV image display area 51b of the display screen 51, oval and quadrangular images as illustrated in FIG. 14(a) are displayed. FIG. 14(a) illustrates a state of the TV image displayed on the display screen 51 in the horizontally long display state, and also a state where the TV image display area 51b of the display screen 51 is sectioned into the nine enlargement target areas 93a. In the present embodiment, at an initial stage, any of the enlargement target areas 93a is set so as not to form an overlap area with an adjacent enlargement area.

Also, FIG. 14(b) illustrates a state where a first enlarged TV image in which an enlargement target area 93a in an upper left part in the state of (a) is specified and enlarged is displayed on the display screen 51. Further, FIG. 14(c) illustrates a state where an image within an enlargement target area 93b that is newly set to serve as a larger enlargement target area than the initial enlargement target area 93a illustrated in FIG. 14(a) is enlarged to display a second enlargement TV image.

In the present embodiment, the image enlarging part 91 equally sections the entire display area of the TV image display area 51b into the nine enlargement target areas 93a with the boundary lines 93. In the sectioned state as described above, for example, the No. [1] operation key 71 is pressed, and thereby an image within the No. [1] enlargement target area 93a in the left-hand side upper part in FIG. 14(a) is enlarged to display the first enlarged TV image. In the TV image displayed in the normal browsing mode, an image in which a character string "abcd" is displayed inside an oval is displayed; however, in the corresponding first enlarged TV image, the characters "abc" and a part of the oval are only displayed, and therefore a shape of the oval and content of the character string cannot be recognized.

For this reason, in the present embodiment, by keep pressing the No. [1] operation key 71, the new second enlargement target area 93b is set, in which the enlargement target area 93a illustrated in FIG. 14(a) is enlarged. Then, as illustrated in FIG. 14(c), an image within the second enlargement target area 93b is enlarged to display the second enlarged TV image on the display screen 51. The second enlargement target area 93b is set to form an overlap area with an adjacent enlargement target area.

The second enlarged TV image is an enlarged image in which the image within the new second enlargement target area 93b that is the enlarged enlargement target area 93a and formed with the overlap area with the adjacent enlargement target area is enlarged. As a result, even in the case where the oval image is not entirely displayed in the first enlarged TV image as illustrated in FIG. 14(b), by changing to the second enlarged TV image, the oval image can be brought into a state of being entirely displayed, and therefore not only the oval shape but also the content of the character string inside the oval can be recognized.

In addition, the present embodiment is also adapted such that, if the operation key 71 kept pressing is brought into a state of not being pressed, the enlargement browsing mode returns to the normal browsing mode corresponding to the image state illustrated in FIG. 14(a).

Figure 15:
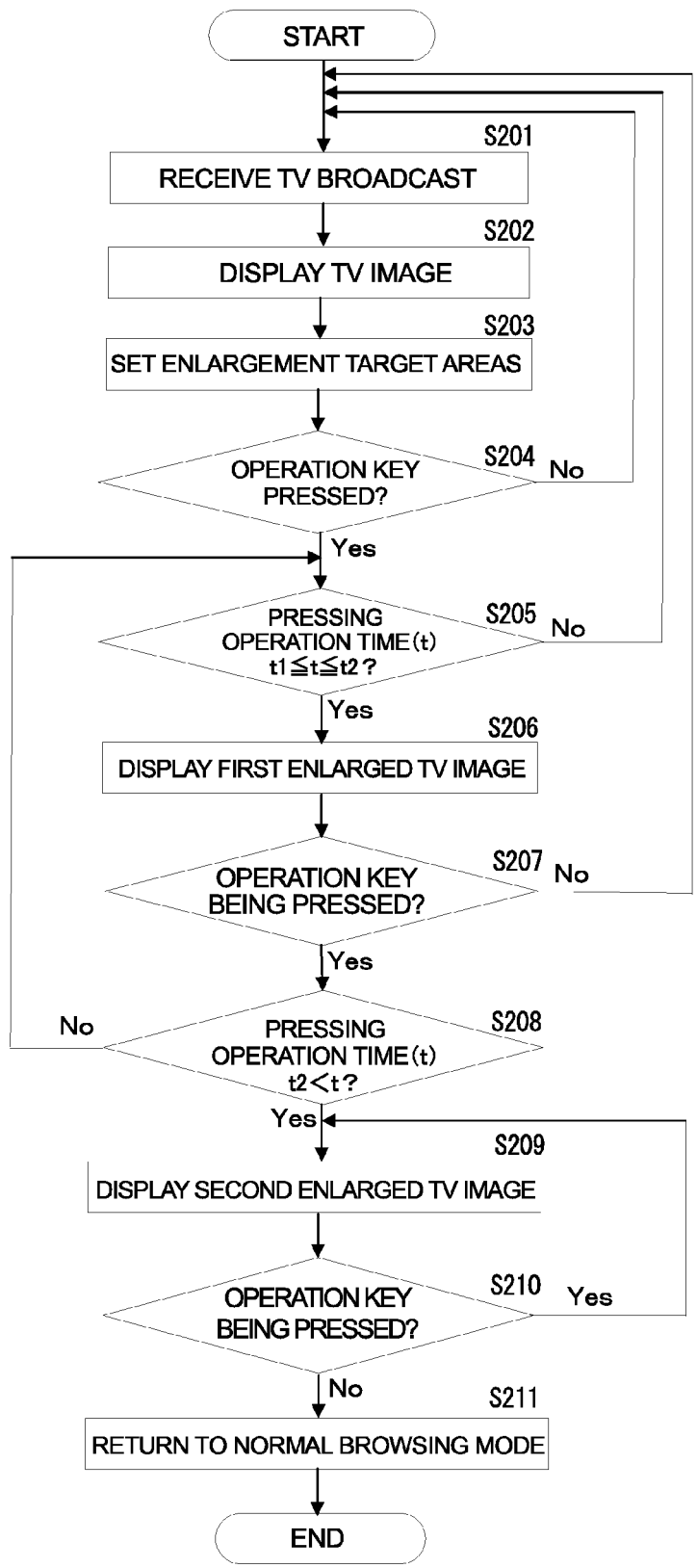
FIG. 15 is a flowchart illustrating an example of processing for enlarging and displaying a part of a TV image in the second embodiment of the present invention.

FIG. 15 is a flowchart illustrating processing of receiving a TV broadcast with the display screen being in the horizontally long display state; changing the normal browsing mode in which a TV image is displayed on the display screen to the enlarged browsing mode; and enlarging and displaying a part of the image.

When the TV broadcast is received in the horizontally long display state (Step S201), the TV image is displayed on the display screen (Step S202). A state of Step S202 is the normal browsing mode. When the TV image is displayed on the display screen, the nine enlargement target areas are set for the TV image display area of the display screen as illustrated in FIG. 14(a) (Step S203).

In a display image generating part, it is determined whether or not a predetermined operation key has been pressed (Step S204). If it is determined that the operation key has been pressed (Yes in Step S204), it is further determined whether or not a pressing operation time (t) of the operation key is within a predetermined time period (t1≦t≦t2) (Step S205). If it is determined in Step S204 that the operation key is not pressed (No in Step S204), the flow returns to Step S202 where a display image including the entire TV image is generated to keep the normal browsing mode without enlarging the image.

If the pressing operation time (t) of the operation key is within the predetermined time period (t1≦t≦t2) (Yes in Step S205), the image enlarging part generates an enlarged TV image for an enlargement target area specified by the operation key, and a display image including a first enlarged TV image generated in the display image generating part in the state of FIG. 14(b) is displayed on the display screen (Step S206). On the other hand, if the pressing operation time does not reach the predetermined time period (No in Step S205), the flow returns to Step S202 where the normal browsing mode in which the entire TV image is displayed on the display screen is kept.

Then, the display image generating part determines whether or not the same operation key is kept pressing without releasing a finger (Step S207). If the operation key is kept pressing without releasing a finger (Yes in Step S207), it is further determined whether or not the pressing operation time of the operation key (t) exceeds the predetermined time period (t2<t) (Step S208). On the other hand, if the operation key is not pressed, i.e., if a finger has been released from the operation key to perform a releasing operation (No in Step S207), the flow returns to Step S202 where the normal browsing mode in which the entire TV image is displayed on the display screen is kept.

If it is determined in Step S208 that the pressing operation time (t) of the operation key exceeds the predetermined time period (t2), the image enlarging part generated a second enlarged TV image, and displays on the display screen a display image including the second enlarged TV image generated in the display image generating part in the above-described state in FIG. 14(c) (Step S209). Also, if the pressing operation time is equal to or less than the predetermined time period (t2) (No in Step S208), the flow returns to Step S205.

In a state where the second enlarged TV image is displayed in Step S209, it is determined whether or not the operation key is pressed (Step S210). If the pressing operation of the operation key is kept (Yes in Step S210), the flow returns to Step S209 to keep the state where the second enlarged TV image is displayed on the display screen. Also, if it is determined that the operation key is not pressed (Yes in Step S210), the enlargement browsing mode returns to the normal browsing mode (Step S211).

In the present embodiment, each of the initially set enlargement target areas 93a is set so as not to form an overlap area with an adjacent enlargement target area, and therefore with the first enlarged TV image that was subjected to the initial enlargement operation and displayed, content of the image may not be fully recognizable. In such a case, a user can keep pressing the operation key to set the enlargement target area 93b that is larger in area than the initial enlargement target area 93, and enlarge an image within the subsequent enlargement target area 93b to display the second enlarged TV image on the display screen. As described, if when a TV image is displayed with the cellular phone 1, there is a part of which content is difficult to recognize, the part difficult to recognize can be enlarged stepwise to broaden a display area, and therefore the content of the part becomes recognizable.

In addition, even the present second embodiment is adapted such that around an enlarged TV image, a part of a TV image, which is not enlarged, is displayed, and therefore only by watching the enlarged TV image, it can be easily determined at which position an enlargement target area is enlarged.

Third Embodiment

Figure 16:
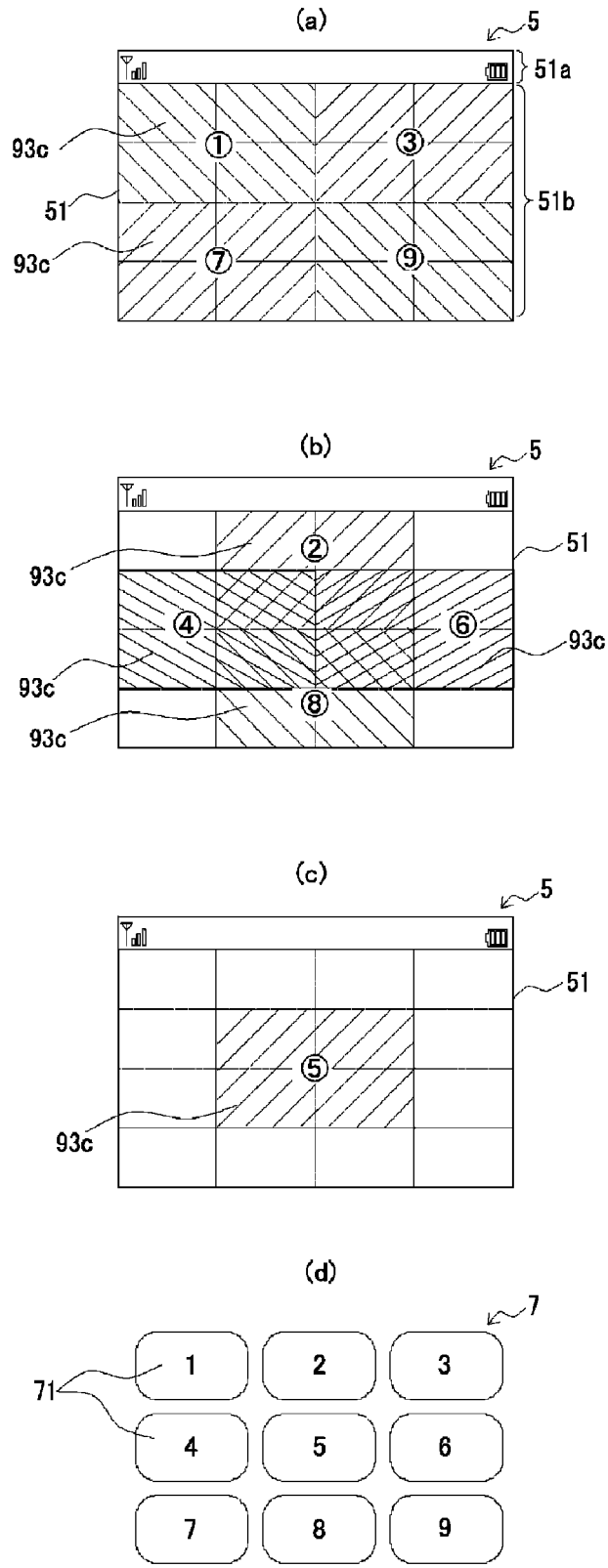
FIG. 16 is a diagram illustrating an arrangement state of enlargement target areas set on a display screen, and a positional relationship between enlargement target areas and operation keys in a third embodiment of the present invention.

In a third embodiment, as illustrated in FIG. 16, an enlargement target area is set such that a half area thereof overlaps with an adjacent enlargement target area. A structure of a cellular phone used in the present embodiment is also the same as that in the above-described embodiment 1, but a method for setting enlargement target areas and a processing method for enlarging and displaying an image corresponding to a predetermine enlargement target area are different from those in the first embodiment. In addition, the same components are denoted by the same symbols to omit description thereof.

FIG. 16(a) to (c) illustrates a position and size of each of the enlargement target areas in a TV image display area, and FIG. 16(d) illustrates an arrangement of operation keys in an operation part.

Even in the present third embodiment, an image enlarging part 91 sets the nine enlargement target areas 93c for the TV image display area 51b of a display screen 51. Also in this case, each of the enlargement target areas 93c is set corresponding to the arrangement of the operation keys 71, and also set such that a half area thereof overlaps with an adjacent enlargement target area 93c.

Specifically, as illustrated in FIG. 16(a), enlargement target areas 93c (Nos. [1], [3], [7], [9]) at the four corners are arranged with the TV image display area 51b being sectioned into equal four pieces. The remaining enlargement target areas 93c are, as illustrated in FIG. 16(b), arranged as the same sized areas such that a No. [2] enlargement target area 93c is positioned between the Nos. [1] and [3] enlargement target areas; a No. [8] enlargement target area 93c is positioned between the Nos. [7] and [9] enlargement target areas; a No. [4] enlargement target area 93c is positioned between the Nos. [1] and [7] enlargement target areas; and a No. [6] enlargement target area 93c is positioned between the Nos. [3] and [9] enlargement target areas. Also, at the center of them, a No. [5] enlargement target area 93c is arranged. Each of the enlargement target areas 93c is set such that a half area thereof overlaps with each of vertically and horizontally adjacent enlargement target areas 93c.

For example, the No. [1] enlargement target area overlaps with each of the horizontally and vertically adjacent enlargement target areas (Nos. [2] and [4] enlargement target areas) respectively in their half areas, and with the adjacent central enlargement target area (No. [5] enlargement target area) respectively in their ¼ areas.

Also, each of the Nos. [2], [4], [6], and [8] enlargement target areas overlaps with each of vertically and horizontally adjacent enlargement target areas respectively in their half areas; and the central No. [5] enlargement target area overlaps with each of the four corner enlargement target areas respectively in their ¼ areas, and with each of the vertically and horizontally adjacent enlargement target areas respectively in their half areas.

Also in the present third embodiment, each of the above-described enlargement target areas 93c is related to an operation key having the same number as that thereof. Accordingly, by pressing the No. [1] operation key 71, the No. [1] enlargement target area 93c is specified.

Figure 17:
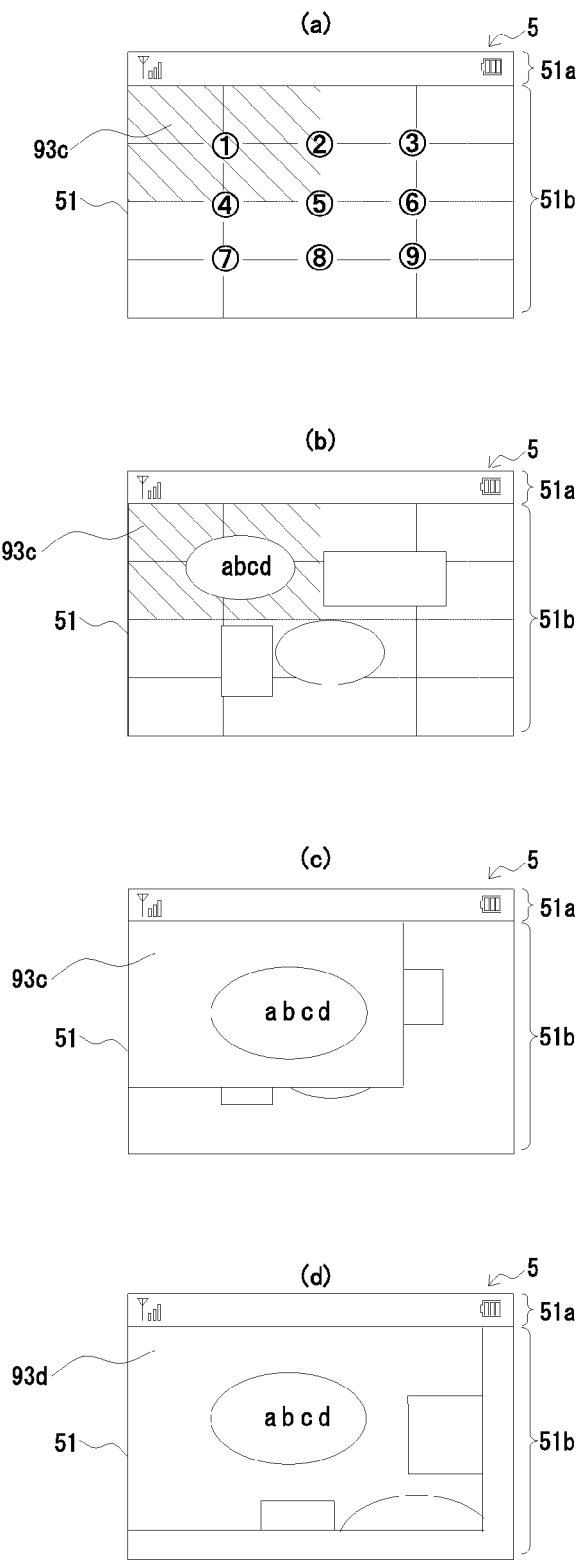
FIG. 17 is an explanatory diagram of processing of enlarging an image within an enlargement target area in the third embodiment of the present invention.

Next, specific processing of enlarging an image within a predetermined enlargement target area with respect to a TV image in the horizontally long display state in the present third embodiment is described on the basis of FIG. 17. FIG. 17(a) illustrates a state where the nine enlargement target areas 93c are set in the TV image display area 51b of the display screen 51 for the case where the cellular phone 1 is brought into the horizontally long display state. FIG. 17(b) illustrates a state of the TV image displayed in the TV image display area 51b of the display screen 51. FIG. 17(c) illustrates a state where a first enlarged TV image in which an image within an enlargement target area 93c in an upper left part (No. [1]) in the state of (b) is enlarged is displayed on the display screen 51. FIG. 17(d) illustrates a state where a second enlarged TV image in which an image within an enlarged target area 93d newly set to serve as a larger enlargement target area than the initial enlargement target area 93c illustrated in (a) is enlarged is displayed.

Further, even in the present embodiment, when any of the operation keys 71 remains pressed, the image enlarging part 91 performs processing of enlarging and displaying an image within an enlargement target area corresponding to the operation key 71.

Processing of displaying an enlarged TV image in the present third embodiment is specifically described on the basis of FIG. 17. In the case where oval and quadrangular images as illustrated in FIG. 17(b) are displayed on the display screen 51 of a display part 5, the image enlarging part 91 first sets the nine enlargement target areas 93c for an entire area of the TV image display area 51b of the display screen 51 such that each of the enlargement target areas 93c overlaps with a part of an adjacent enlargement target area as described above.

In the case where the enlargement target area 93c indicated by No. [1] in the left-hand side upper part in FIG. 17(b) is enlarged and displayed, a user first performs an operation of pressing the No. [1] operation key 71. If he/she keeps pressing the operation key 71, as illustrated in FIG. 17(c), an image within the No. [1] enlargement target area 93c corresponding to the operation key 71 is enlarged to generate a first enlarged TV image with parts of the enlargement target areas 93c (Nos. [2], [4], and [5] enlargement target areas) adjacent to the No. [1] enlargement target area 93c overlapping, and the first enlarged TV image is displayed on the display screen by a display image generating part 92. The first enlarged TV image is, as illustrated in FIG. 17(c), displayed in the left-hand side upper part of the TV image display area 51b.

In the present embodiment, each of the enlargement target areas 93c is in the state of overlapping with each of vertically and horizontally adjacent enlargement target areas 93c in their half areas, and therefore a size of each of the enlargement target areas 93c is considerably larger than that of each of the enlargement target areas 93 in the above-described first embodiment. As a result, one of the enlargement target areas is larger in area, so that, as illustrated in FIG. 17(b), the first enlarged TV image is brought into a state of completely including the entire oval image, and therefore content of the oval image can be surely recognized.

Also, in the present third embodiment, the cellular phone 1 is adapted such that, by keeping pressing the operation key 71 to obtain the first enlarged TV image illustrated in FIG. 17(c), and then keeping pressing the operation key 71 for the predetermined time period without releasing a finger, the enlargement target area is enlarged from the first enlarged TV image as illustrated in FIG. 17(d) to be able to display the second enlarged TV image.

That is, by keeping pressing the No. [1] operation key 71, the image enlarging part 91 sets the new second enlargement target area 93d in which the enlargement target area 93c illustrated in FIG. 17(a) is enlarged. Then, as illustrated in FIG. 17(d), the image within the second enlargement target area 93d is enlarged to generate the second enlarged TV image, and the second enlarged TV image is displayed on the display screen 51 by the display image generating part 92. The second enlargement target area 93d is set so as to further increase the overlap areas with the adjacent enlargement target areas. As described, by changing the first enlarged TV image illustrated in FIG. 17(c) to the second enlarged TV image illustrated in FIG. 17(d), content of the image becomes easier to recognize.

Further, even the present third embodiment is adapted such that around an enlarged TV image, a part of a TV image that is not enlarged is displayed, and therefore only by watching the enlarged TV image, it can be easily determined at which position an enlargement target area is enlarged.

Note that the processing of enlarging and displaying a part of an image in the present third embodiment is performed in the same manner as in the above-described second embodiment.

As described above, in the third embodiment, each of the enlargement target areas is configured to be larger in area so as to overlap with adjacent enlargement target areas, and therefore when a user performs a pressing operation of an operation key in the operation part to enlarge and display an image within an enlargement target area, content of an enlarged and displayed enlarged TV image becomes easy to recognize. Further, by continuously keeping the pressing operation state of the operation key, the enlargement target area can be further enlarged to display an enlarged TV image, and therefore the content of the image becomes easier to recognize.

Fourth Embodiment

In a fourth embodiment, a method for setting enlargement target areas is the same as in the above-described third embodiment, and a first enlarged TV image is also displayed in the same manner as in the above-described third embodiment, but a processing method for displaying a subsequent second enlarged TV image is different from that in the above-described third embodiment. That is, in the present fourth embodiment, regarding the second enlarged TV image, content of the first enlarged TV image is enlarged and displayed on a display screen with an enlargement magnification being increased. In addition, the same components are denoted by the same symbols to omit description thereof. Also, a position and a size of each of the enlargement target areas in a TV image display area are the same as those in the third embodiment illustrated in FIG. 16, and therefore description thereof is omitted.

Also in the present fourth embodiment, each of the above-described enlargement target areas 93 is related to an operation key having the same number as that thereof. Accordingly, by pressing a No. [1] operation key 71, a No. [1] enlargement target area 93c is specified.

Figure 18:
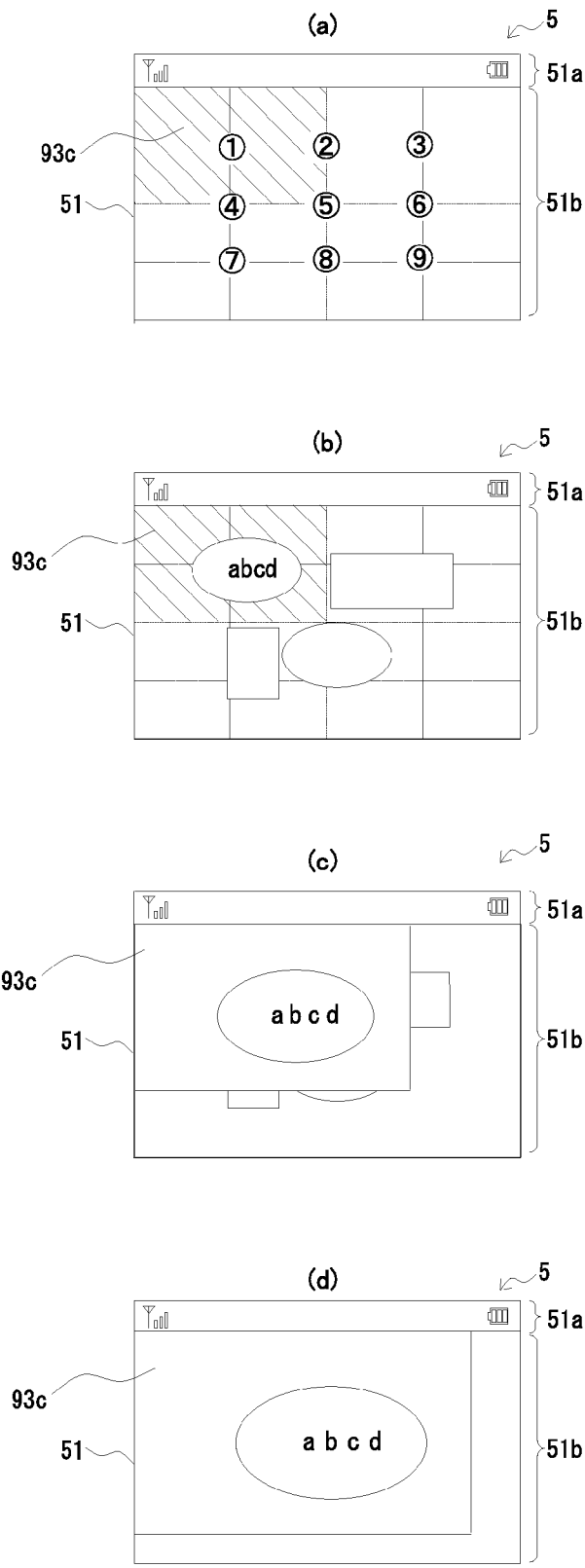
FIG. 18 is an explanatory diagram of processing of enlarging an image within an enlargement target area in a fourth embodiment of the present invention.

Next, specific processing of enlarging an image within a predetermined enlargement target area with respect to a TV image in the horizontally long display state in the present fourth embodiment is described on the basis of FIG. 18. FIG. 18(a) illustrates a state where the nine enlargement target areas 93c are set in a TV image display area 51b of a display screen 51 for the case where a cellular phone 1 is brought into the horizontally long display state. FIG. 18(b) illustrates a state of the TV image displayed in the TV image display area 51b of the display screen 51. FIG. 18(c) illustrates a state where a first enlarged TV image in which an image within an enlargement target area 93c in an upper left part (No. [1]) in the state of (b) is enlarged is displayed on the display screen 51. FIG. 18(d) illustrates a state where an enlargement magnification for the initial enlargement target area 93c illustrated in (a) is increased to display a second enlarged TV image.

In the present fourth embodiment, the cellular phone 1 is adapted such that, by keeping pressing the operation key 71 to obtain the first enlarged TV image in FIG. 18(c), and then keeping pressing the operation key 71 for a predetermine time period without releasing a finger, the first enlarged TV image changes to the second enlarged TV image illustrated in FIG. 18(d).

Note that, also in the present embodiment, when any of operation keys 71 remains pressed, an image enlarging part 91 performs processing of enlarging and displaying an image within an enlargement target area 93 corresponding to the operation key 71.

Processing of displaying an enlarged TV image in the present fourth embodiment is specifically described on the basis of FIG. 18. As illustrated in FIG. 18(c), by keeping pressing a predetermined operation key 71, the image enlarging part 91 enlarges an image within an enlargement target area 93 corresponding to the operation key 71 to generate a first enlarged TV image, and the first enlarged TV image is displayed on the display screen 51 by a display image generating part 92. Then, by further keeping pressing the same operation key 71, the image enlarging part 91 increases an enlargement magnification for the first enlarged TV image to generate a second enlarged TV image, and the second enlarged TV image is displayed on the display screen as illustrated in FIG. 18(d).

In addition, also the present embodiment is adapted such that when the operation key 71 having been kept pressing is restored to a state not being pressed to perform a releasing operation on the operation key, the enlargement browsing mode returns to the state illustrated in FIG. 18(b), i.e., the normal browsing mode.

Further, also in the present fourth embodiment, processing of enlarging and displaying a part of an image is performed in the same manner as in the above-described second embodiment.

Still further, also the present fourth embodiment is adapted such that around an enlarged TV image, a part of a TV image that is not enlarged is displayed, and therefore only by watching the enlarged TV image, it can be easily determined at which position an enlargement target area is enlarged.

Also in the present fourth embodiment, each of the enlargement target areas is configured to be larger in area so as to overlap with adjacent enlargement target areas, and therefore when a user performs a pressing operation of an operation key in the operation part to enlarge and display an image within an enlargement target area, content of the displayed enlarged TV image becomes easy to recognize. Further, by continuously keeping the pressing operation state of the operation key, an enlargement magnification for the enlarged TV image can be further increased to display an enlarged TV image, and therefore the content of the image becomes easier to recognize.

Also, the cellular phone according to each of the above embodiments is configured such that when the display casing is rotated in a plane parallel to the display screen of the display part, switching between the vertically long display state and the horizontally long display state is made. However, the structure of the cellular phone may be configured such that direction detecting means such as a geomagnetic sensor for detecting geomagnetism is used to detect an arrangement direction of the display state with respect to a user, and on the basis of a result of the detection, the switching between the vertically long display state and the horizontally long display state is made. Further, in order to make the switching of the display screen between the horizontally long display state and the vertically long display state, the cellular phone may be adapted to make the switching on the basis of the rotation or sliding operation of the casing, or by an operation with operation buttons on the casing, and the switching can be arbitrarily set.

As a cellular phone applicable with the present invention, a cellular phone not having the configuration of the cellular phone in any of the above-described embodiments, but configured such that a display casing rotates with respect to an operation casing around a shaft parallel to a display screen of a display part can also be applied. Also, a cellular phone configured such that a display casing slides in a direction parallel to a display screen with respect to an operation casing can also be applied. Further, the present invention can also be applied to a cellular phone in which a display casing is adapted to rotate in a plane parallel to a display screen with respect to an operation casing, and when a longer direction of the display casing is positioned vertically to a longer direction of the operation casing, a whole of the casings is brought into an L-shaped state by the display casing and the operation casing. Still further, the present invention can also be applied to a cellular phone in which a display casing slides in a direction parallel to a display screen with respect to an operation casing, and also the display casing rotates in a plane parallel to the display screen with respect to the operation casing. Yet further, the present invention can also be applied to a cellular phone in which a display casing is only folded with respect to an operation casing such that a display part and an operation part face to each other.

Note that the above-described enlargement target areas of the present invention are set as partial areas of a TV image, but can also be set as partial areas of content data in a data broadcast. The data broadcast refers to a system that transmits various pieces of content data such as news and whether forecast, separately from a TV image and TV voice based on a digital TV broadcast wave.

Further, the image enlargement processing method in each of the above-described embodiments can also be applied to the case where when a TV image is displayed on the display screen 51 in the vertically long display state, a part of the TV image is enlarged and displayed.

This application claims priority under the Paris Convention based on the following patent application in Japan: patent application filed on Oct. 12, 2007 (Japanese patent application No. 2007-266143), the entire content of which is incorporated herein by reference.

DESCRIPTION OF REFERENCE NUMERALS

1 Cellular phone
2 Display casing
3 Operation casing
4 Hinge part
41 Connecting part
42 Holding part
5 Display part
51 Display screen
51a Pictogram display
51b TV image display area
51c Data broadcast display area
6 Receiver
7 Operation part
71 Operation key
8 Transmitting microphone
10 TV image generating part
11 Antenna
12 Amplifier
13 Tuner
14 A/D converter
15 Decoder
16 Speaker
90 Switch detecting part
91 Image enlarging part
91a Enlargement target area
91b Image enlargement processing part
92 Display image generating part
93 Enlargement target area
94 Boundary line

What is claimed is:

1. A portable terminal device comprising:
TV image generating means that receives a TV broadcast wave and generates a TV image;
a plurality of operation keys that are arranged in a matrix form;
image enlarging means that, in a state where said TV image is preliminarily sectioned corresponding to an arrangement of said operation keys into a plurality of enlargement target areas, generates a first enlarged TV image by, on a basis of an operation of any of said operation keys, enlarging an image within said enlargement target area related to said operation key subjected to said operation;
display image generating means that, before any of said operation keys is subjected to a pressing down operation, generates a display image including said TV image, and after any of said operation keys is subjected to said pressing down operation, superimposes said first enlarged TV image on said TV image so as to leave a part of said TV image and thereby generates a display image including said first enlarged TV image;
display means that displays said display image generated by said display image generating means; and
target area enlarging means that enlarges said enlargement target area on a basis of a time period during which said operation key is subjected to said pressing down operation, wherein
said image enlarging means generates a second enlarged TV image by enlarging an image within an enlargement target area enlarged by said target area enlarging means, and
said display image generating means generates said display image including said second enlarged TV image.

2. The portable terminal device according to claim 1, wherein
on a basis of a pressing down operation of said operation key, said display image generating means generates said display image including said first enlarged TV image, whereas
on a basis of a releasing operation of said operation key, said display image generating means generates said display the display image including said TV image.

3. The portable terminal device according to claim 1, wherein:
a display screen of said display means is rectangular shaped;
a longer direction of the display screen is changed within a range of 90 degrees with respect to said operation part comprising a plurality of said operation keys to enable switching to a vertically long display state or a horizontally long display state;
switch detecting means that detects the switching for the display state of said display screen is provided; and
said image enlarging means sets enlargement target area groups respectively corresponding to the display screen in said horizontally long display state and said vertically long display state, and on a basis of a result of the detection by said switch detecting means, selects one of said enlargement target area groups.

4. The portable terminal device according to claim 1, wherein:
said image enlarging means enlarges said enlargement target area depending on a time period between said pressing down operation of said operation key and a releasing operation of said operation key.

* * * * *